United States Patent
Tokunaga

(10) Patent No.: US 9,857,860 B2
(45) Date of Patent: Jan. 2, 2018

(54) POWER SUPPLY CONTROL CIRCUIT AND SIGNAL PROCESSING CIRCUIT

(71) Applicant: Semiconductor Energy Laboratory Co., Ltd., Atsugi-shi, Kanagawa-ken (JP)

(72) Inventor: Hajime Tokunaga, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 536 days.

(21) Appl. No.: 13/942,963

(22) Filed: Jul. 16, 2013

(65) Prior Publication Data

US 2014/0025978 A1    Jan. 23, 2014

(30) Foreign Application Priority Data

Jul. 20, 2012    (JP) .................................. 2012-161932

(51) Int. Cl.
*G06F 1/26* (2006.01)
*G06F 1/32* (2006.01)
*G06F 1/30* (2006.01)

(52) U.S. Cl.
CPC .............. *G06F 1/3234* (2013.01); *G06F 1/26* (2013.01); *G06F 1/30* (2013.01)

(58) Field of Classification Search
CPC .............. G06F 1/26; G06F 1/30; G06F 1/3234
See application file for complete search history.

(56) References Cited

U.S. PATENT DOCUMENTS 5,731,856 A    3/1998    Kim et al.
5,744,864 A    4/1998    Cillessen et al.
(Continued)

FOREIGN PATENT DOCUMENTS

EP    1 737 044 A1    12/2006
EP    2 226 847 A2    9/2010
(Continued)

OTHER PUBLICATIONS

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184

(Continued)

*Primary Examiner* — Thomas Lee
*Assistant Examiner* — Gary Collins
(74) *Attorney, Agent, or Firm* — Fish & Richardson P.C.

(57) ABSTRACT

A power supply control circuit for controlling power supply or stop of power supply is provided between a power source and a circuit block such as a processor. The power supply control circuit not only performs power supply to the circuit block or intentionally stops power supply but also is able to hold the power supply potential when the power supply is suddenly stopped, so that a loss of data in the circuit block can be prevented. By utilizing the power supply potential held by the power supply control circuit, data in the circuit block is saved in the nonvolatile memory device, so that a loss of data in the circuit block can be prevented. As described above, the power supply control circuit functions as a power gating switch and a circuit for holding the power supply potential in the case where power supply is suddenly stopped.

18 Claims, 11 Drawing Sheets

(56) References Cited

U.S. PATENT DOCUMENTS

| | | | |
|---|---|---|---|
| 6,294,274 B1 | 9/2001 | Kawazoe et al. | |
| 6,563,174 B2 | 5/2003 | Kawasaki et al. | |
| 6,657,911 B2 | 12/2003 | Yamaoka et al. | |
| 6,727,522 B1 | 4/2004 | Kawasaki et al. | |
| 6,914,803 B2 | 7/2005 | Yamaoka et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,088,131 B1 * | 8/2006 | Stout | G11C 5/14 326/33 |
| 7,099,183 B2 | 8/2006 | Yamaoka et al. | |
| 7,105,868 B2 | 9/2006 | Nause et al. | |
| 7,211,825 B2 | 5/2007 | Shih et al | |
| 7,272,068 B2 | 9/2007 | Yamaoka et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,474,584 B2 | 1/2009 | Yamaoka et al. | |
| 7,501,293 B2 | 3/2009 | Ito et al. | |
| 7,646,662 B2 | 1/2010 | Yamaoka et al. | |
| 7,674,650 B2 | 3/2010 | Akimoto et al. | |
| 7,732,819 B2 | 6/2010 | Akimoto et al. | |
| 7,902,914 B2 | 3/2011 | Kawasaki | |
| 7,961,545 B2 | 6/2011 | Yamaoka et al. | |
| 8,296,534 B1 * | 10/2012 | Gupta et al. | 711/162 |
| 8,446,171 B2 | 5/2013 | Takahashi | |
| 8,547,771 B2 | 10/2013 | Koyama | |
| 8,995,174 B2 | 3/2015 | Koyama | |
| 8,995,218 B2 * | 3/2015 | Koyama | 365/227 |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2005/0218952 A1 * | 10/2005 | Padhye et al. | 327/218 |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0091913 A1 * | 5/2006 | Bhattacharya | 326/97 |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0165608 A1 * | 7/2008 | Choi et al. | 365/228 |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2008/0307244 A1 * | 12/2008 | Bertelsen et al. | 713/323 |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0180065 A1 * | 7/2010 | Cherian et al. | 711/103 |
| 2011/0213947 A1 * | 9/2011 | Mathieson et al. | 712/16 |
| 2011/0216579 A1 | 9/2011 | Yamaoka et al. | |
| 2011/0273221 A1 * | 11/2011 | Kim | H03K 17/284 327/399 |
| 2012/0032730 A1 * | 2/2012 | Koyama | 327/530 |
| 2012/0286823 A1 | 11/2012 | Yoneda | |
| 2012/0292613 A1 | 11/2012 | Shionoiri et al. | |
| 2012/0294102 A1 | 11/2012 | Ishizu | |
| 2013/0097450 A1 * | 4/2013 | Patel | 713/340 |
| 2013/0134416 A1 | 5/2013 | Nishijima et al. | |
| 2013/0262828 A1 * | 10/2013 | Yoneda | 712/208 |
| 2013/0293282 A1 * | 11/2013 | Rotem | H03K 17/687 327/427 |
| 2013/0297952 A1 * | 11/2013 | Miyake | 713/300 |
| 2013/0326309 A1 * | 12/2013 | Yoneda | 714/763 |
| 2014/0001861 A1 * | 1/2014 | Mann et al. | 307/66 |
| 2014/0015590 A1 * | 1/2014 | Yoon | H03K 19/0016 327/378 |
| 2014/0075091 A1 * | 3/2014 | Bartling et al. | 711/102 |
| 2015/0280691 A1 | 10/2015 | Koyama | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-132683 A | 5/2003 |

(56) References Cited

FOREIGN PATENT DOCUMENTS

| JP | 2004-103957 A | 4/2004 |
|---|---|---|
| JP | 2004-273614 A | 9/2004 |
| JP | 2004-273732 A | 9/2004 |
| WO | 2004/114391 A1 | 12/2004 |
| WO | WO-2012/017843 | 2/2012 |

OTHER PUBLICATIONS

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for Amoled Back-Plane," SID Digest '09 : SID International Symposium Digest of Technical Papers, May 31, 2009, pp. 280-283.

Clark, S et al., "First Principles Methods Using Castep," Zeitschrift fur Kristallographie, 2005, vol. 220, pp. 567-570.

Coates. D et al., Optical Studies of the Amorphous Liquid-Cholesteric Liquid Crystal Transition: The "Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTs) for AMLCDs," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using Cg-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA Amoled Display Driven by Indium-Gallium-Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission Amoled Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YBFe2O4, and YB2Fe3O7 Types of Structures for Compounds in the In2O3 and SC2O3—A2O3—BO Systems [A; Fe, Ga, or Al; B: Mg, Mn, Fe, Ni, Cu, or Zn] at Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

(56) References Cited

OTHER PUBLICATIONS

Miyasaka, M, "SUFTLA Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW'08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the $In_2O_3$—$Ga_2ZnO_4$—$ZnO$ system at 1350° C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics), 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline $InGaO_3(ZnO)_5$ films," Appl. Phys. Lett. (Applied Physics Letters), Sep. 13, 2004, vol. 85, No. 11, pp. 1993-1995.

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.

Taiwanese Office Action (Application No. 102125563) Dated Feb. 22, 2017.

Ohara.H et al., "Amorphous In-Ga-Zn-Oxide TFTs with Suppressed Variation for 4.0 inch QVGA AMOLED Display", AM-FPD '09 Digest of Technical Papers, Jul. 1, 2009, pp. 227-230, the Japan Society of Applied Physics.

Orita.M et al., "Amorphous transparent conductive oxide $InGaO_3(ZnO)_m$ (m<4):a Zn4s conductor", Philosophical Magazine, 2001, vol. 81, No. 5, pp. 501-515.

Orita.M et al., "Mechanism of Electrical Conductivity of Transparent $InGaZnO_4$", Phys. Rev. B (Physical Review. B), Jan. 15, 2000, vol. 61, No. 3, pp. 1811-1816.

Osada.T et al., "15.2: Development of Driver-Integrated Panel using Amorphous In-Ga-Zn-Oxide TFT", SID Digest '09 : SID International Symposium Digest of Technical Papers, May 31, 2009, pp. 184-187.

Osada.T et al., "Development of Driver-Integrated Panel Using Amorphous In-Ga-Zn-Oxide TFT", AM-FPD '09 Digest of Technical Papers, Jul. 1, 2009, pp. 33-36.

Park.J et al., "Amorphous Indium-Gallium-Zinc Oxide TFTS and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor upon exposure to water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED driven by PEALD Grown ZNO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous IN-GA-ZN-Oxide TFTS", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO ($Ga_2O_3$-$In_2O_3$-$ZnO$) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on $SrTiO_3$ With Sputtered $Al_2O_3$ Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul 31, 2000, vol. 85, No. 5, pp. 1012-1015.

\* cited by examiner

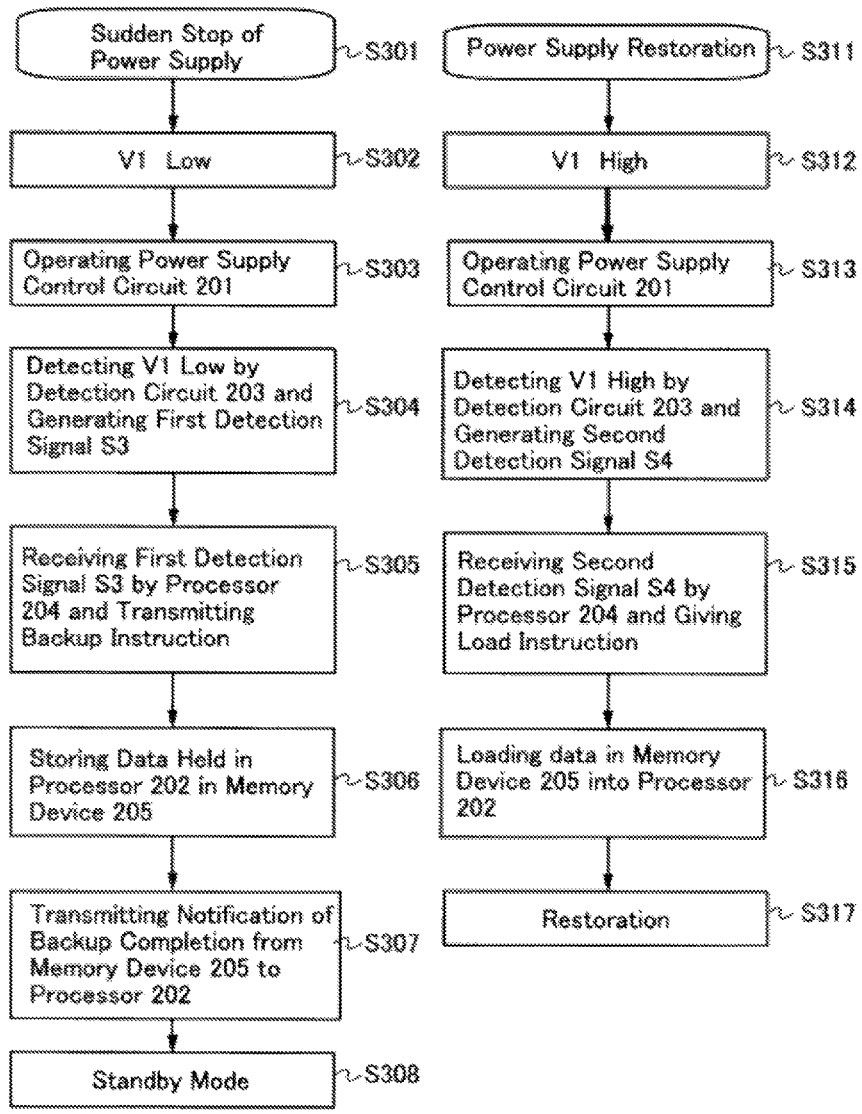

POWER SUPPLY CONTROL CIRCUIT AND SIGNAL PROCESSING CIRCUIT

BACKGROUND OF THE INVENTION

1. Field of the Invention

The present invention relates to a signal processing circuit capable of holding data even when not powered and a method for driving the signal processing circuit.

2. Description of the Related Art

In recent years, circuit operation has become complicated with higher integration and an increase in size of a semiconductor integrated circuit. Further, with miniaturization of a process of a semiconductor integrated circuit, leakage current of a transistor is increased, which causes a problem in that excess power is consumed owing to the leakage current even when the semiconductor integrated circuit is not in operation.

In that situation, a power gating (power-off) technique by which power supply or stop of power supply is performed to respective related circuit blocks formed in a semiconductor integrated circuit so that power consumption due to leakage current in circuit blocks which are not used is suppressed has been proposed.

For example, Patent Document 1 discloses a semiconductor integrated circuit which includes: a switch formed using a MOS transistor between a logic circuit and a power source so that power supply and stop of power supply are collectively performed to circuit blocks; and an SRAM circuit which controls the substrate potential of the MOS transistor so that power consumption due to leakage current is suppressed. With such a power gating technique, power supply to circuits which are not used in the semiconductor integrated circuit can be stopped per circuit block, so that excess power consumption due to leakage current can be suppressed.

[Reference]
[Patent Document]
[Patent Document 1] Japanese Published Patent Application No. 2003-132683

SUMMARY OF THE INVENTION

In a semiconductor integrated circuit, power supply is suddenly stopped by a power failure due to lighting or the like or disconnection of a power plug from an outlet in some cases other than the case of power-off by operation by a user, and the like. When power supply is suddenly stopped in a state where a circuit block is powered, data in the circuit block is lost with the stop of the power supply because a volatile memory device such as an SRAM or the like is usually used as a memory device in which the data in the circuit block is stored.

In order to prevent such a situation, a power-gating switch is turned off at the same time as the stop of the power supply, so that flow of charge from the circuit block to a power line can be suppressed. However, in a transistor using a normal semiconductor (e.g., silicon), leakage current flows even in an off state, so that flow of charge cannot be completely prevented.

In view of the above problems, an object of one embodiment of the present invention is to provide a power supply control circuit in which power consumption can be reduced and a loss of data in a circuit block can be prevented even when power supply is suddenly stopped. Further, another object is to provide a signal processing circuit provided with the power supply control circuit.

In one embodiment of the present invention, a power supply control circuit for controlling power supply or stop of power supply is provided between a power source and a circuit block such as a processor. The power supply control circuit not only performs power supply to the circuit block or intentionally stops power supply but also is able to hold the power supply potential so as to prevent a loss of data in the circuit block when power supply is suddenly stopped. By utilizing the power supply potential held by the power supply control circuit, data in the circuit block is saved in a nonvolatile memory device, so that a loss of data in the circuit block can be prevented. As described above, the power supply control circuit functions as a power gating switch and a circuit for holding the power supply potential in the case where power supply is suddenly stopped.

The power supply control circuit according to one embodiment of the present invention is provided with a first switching element for controlling power supply or stop of power supply. Further, a switching control portion for controlling on or off of the first switching element is provided. The switching control portion includes a second switching element and a third switching element. A capacitor for holding the power supply potential when the first switching element is turned off is provided in parallel between the first switching element and the circuit block.

In the switching control portion, the first switching element can be turned on by turning on the second switching element and turning off the third switching element. The first switching element can be turned off by turning off the second switching element and turning on the third switching element.

A transistor with a small off-state current is preferably used as the first switching element. As the transistor with a small off-state current, a transistor which has a channel in a semiconductor having a wider band gap and lower intrinsic carrier density than silicon is preferable. Such a semiconductor preferably has a band gap twice or more as wide as silicon; for example, an oxide semiconductor such as a gallium oxide, a nitride semiconductor such as a gallium nitride, a compound semiconductor such as silicon carbide or a gallium arsenide can be given.

Note that in this specification and the like, off-state current is current that flows between a source and a drain when a transistor is in an off state. In the case of an n-channel transistor (e.g., with a threshold voltage of about 0 V to 2 V), the off-state current means current flowing between a source and a drain when a negative voltage is applied between a gate and the source.

For example, with the use of a transistor including an oxide semiconductor as the first switching element, charge can be prevented from leaking from the circuit block to the power line because the off-state current of the transistor is extremely small. Accordingly, while the operation of the circuit block is stopped, a loss of data stored in the circuit block can be prevented even when power supply from the power source to the circuit block is stopped.

In the case where power supply is suddenly stopped by a power failure and the like, the third switching element is turned off, and the second switching element is turned on for a certain period of time and then turned off, whereby the first switching element can be surely turned off. Accordingly, the charge accumulated in the capacitor that is connected in parallel between the first switching element and the circuit block can be prevented from leaking; thus, the power supply potential can be held in the circuit block for a certain period. In this period, the data stored in the circuit block is saved in the nonvolatile memory device, whereby the data in the circuit block can be prevented from being lost at the same time as the stop of the power supply.

In one embodiment of the present invention, the power supply control circuit includes a first transistor functioning as a first switching element, a second transistor functioning as a second switching element, a third transistor functioning as a third switching element, and a first and a second capacitor.

The power supply control circuit includes a first and a second power line, the first to the third transistor, and the first and the second capacitor. One of a source and a drain of the first transistor is electrically connected to one of a pair of electrodes of the first capacitor to form a node; the other of the source and the drain of the first transistor is electrically connected to the first power line to which a high-level potential is applied; one of a source and a drain of the second transistor is electrically connected to one of a source and a drain of the third transistor and a gate of the first transistor; the other of the source and the drain of the second transistor is electrically connected to the first power line; and the other of the source and the drain of the third transistor and the other of the pair of electrodes of the first capacitor are electrically connected to the second power line to which a low-level potential is applied.

In the above configuration, a transistor with an extremely small off-state current is used as the first transistor. Thus, current flowing from the first power line into a circuit block such as a processor can be blocked by turning off the first transistor. Thus, power consumed in the circuit block can be reduced. Accordingly, the power supply control circuit can function as a power gating switch.

A signal processing circuit includes a first and a second power line; a detection circuit and a power supply control circuit which are electrically connected to the first and the second power lines; and first and second processors and a nonvolatile memory device which are electrically connected to the second power line via the power supply control circuit. The power supply control circuit controls power supply from the first power line to the first processor or stop of power supply; the detection circuit transmits a detection signal to the second processor when detecting a change in a potential of the first power line from a high-level potential to a low-level potential; the second processor transmits, when the detection signal is input, a backup instruction to the first processor so that data in the first processor is held in the nonvolatile memory device; the first processor transmits the data to the nonvolatile memory device in response to the backup instruction; and the nonvolatile memory device holds the data in the first processor.

In the above configuration, the power supply control circuit is provided between a power source and the first processor, so that data can be rapidly transferred to the nonvolatile memory device from the first processor even when power supply is suddenly stopped. Thus, a loss of data in the first processor can be prevented.

The area of the signal processing circuit can be reduced in such a manner that the first and the second processor and the like which need to operate at high speed are formed using a transistor including a layer or a substrate made of silicon and the power supply control circuit is stacked over a layer where the transistor is formed.

According to one embodiment of the present invention, a power supply control circuit in which power consumption can be reduced and a loss of data in a circuit block can be prevented even when power supply is suddenly stopped can be provided. Further, a signal processing circuit provided with the power supply control circuit can be provided.

BRIEF DESCRIPTION OF THE DRAWINGS

In the accompanying drawings:

FIGS. 4A and 4B are flowcharts illustrating operation of a signal processing circuit;

DETAILED DESCRIPTION OF THE INVENTION

Figure 1:
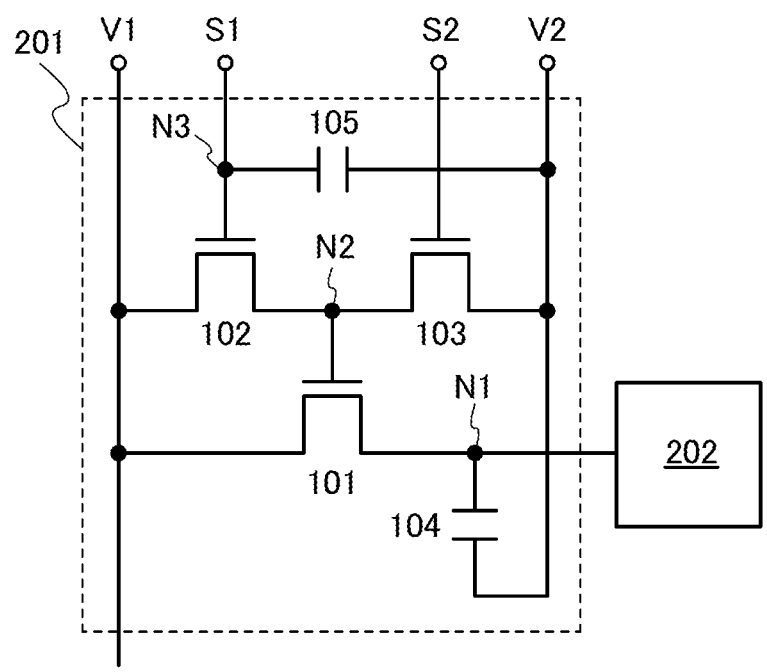
FIG. 1 illustrates a power supply control circuit.

Hereinafter, embodiments of the present invention will be described in detail with reference to the accompanying drawings. However, the present invention is not limited to the following description and it is easily understood by those skilled in the art that the mode and details can be variously changed without departing from the scope and spirit of the present invention. Accordingly, the invention should not be construed as being limited to the description of the embodiments below.

Note that functions of the "source" and "drain" may be switched in the case where transistors of different polarities are employed or in the case where the direction of a current flow changes in a circuit operation, for example. Therefore, the terms "source" and "drain" can be used to denote the drain and the source, respectively, in this specification.

Note that in this specification and the like, the term "electrically connected" includes the case where components are connected through an "object having any electric function". There is no particular limitation on the object having any electric function as long as electric signals can be transmitted and received between the components connected through the object. Examples of an "object having any electric function" are a switching element such as a transistor, a resistor, an inductor, a capacitor, and an element with a variety of functions as well as an electrode and a wiring.

In addition, even when a circuit diagram shows independent components as if they are electrically connected to each other, there is actually a case where one conductive film has functions of a plurality of components such as a case where part of a wiring also functions as an electrode. The "electrical connection" in this specification includes in its category such a case where one conductive film has functions of a plurality of components.

In this specification and the like, the terms "over" and "below" do not necessarily mean "directly on" and "directly below", respectively, in the description of a physical relationship between components. For example, the expression "a gate electrode over a gate insulating layer" can mean the case where there is an additional component between the gate insulating layer and the gate electrode. Moreover, the terms such as "over" and "below" are simply used for convenience of explanation.

Note that the position, size, range, or the like of each component illustrated in drawings and the like is not accurately represented in some cases for easy understanding. Therefore, the disclosed invention is not necessarily limited to the position, size, range, or the like as disclosed in the drawings and the like.

The ordinal number such as "first", "second", and "third" are used in order to avoid confusion among components.

[Embodiment 1]

In this embodiment, an example of a signal processing circuit provided with a power supply control circuit is described with reference to FIG. 1 and FIGS. 2A and 2B.

[Configuration of Power Supply Control Circuit]

A power supply control circuit according to one embodiment of the present invention includes a first switching element for controlling power supply or stop of power supply, a switching control portion for controlling on or off of the first switching element, and a capacitor for holding the power supply potential when the first switching element is turned off. The switching control portion includes a second switching element and a third switching element.

A power supply control circuit 201 illustrated in FIG. 1 includes a transistor 101, a transistor 102, a transistor 103, a capacitor 104, and a capacitor 105. Further, a processor 202 includes one or a plurality of volatile memory devices such as a register or a cache memory.

One of a source and a drain of the transistor 101 which functions as the first switching element is electrically connected to one of a pair of electrodes of the capacitor 104 and the processor 202 to form a node N1, and the other of the source and the drain of the transistor 101 is electrically connected to a first power line V1 to which a first potential is applied. Further, the other of the pair of electrodes of the capacitor 104 is electrically connected to a second power line V2 to which a second potential that is lower than the first potential is applied.

One of a source and a drain of the transistor 102 which functions as the second switching element is electrically connected to one of a source and a drain of the transistor 103 which functions as the third switching element and a gate of the transistor 101 to form a node N2. The other of the source and the drain of the transistor 102 is electrically connected to the first power line V1. The other of the source and the drain of the transistor 103 is electrically connected to the second power line V2.

A gate of the transistor 102 is electrically connected to a signal line to which a control signal S1 is input and one of a pair of electrodes of the capacitor 105 to form a node N3. Since the capacitor 105 is electrically connected to the gate of the transistor 102, an on state can be kept for a certain period even when the supply of potential from the signal line to which the control signal S1 is input is stopped. Further, a gate of the transistor 103 is electrically connected to a signal line to which a control signal S2 is input. The other of the pair of electrodes of the capacitor 105 is electrically connected to the second power line V2.

An on state or an off state of the transistor 101 is controlled on the basis of the potential of the node N2; an on state or an off state of the transistor 102 is controlled on the basis of the control signal S1; and an on state or an off state of the transistor 103 is controlled on the basis of the control signal S2.

The transistor 101 is preferably a transistor with a small off-state current. As the transistor with a small off-state current, a transistor which has a channel in, for example, a semiconductor having a wider band gap and lower intrinsic carrier density than silicon is preferable. Such a semiconductor preferably has a band gap twice or more as wide as that of silicon; for example, an oxide semiconductor such as gallium oxide, a nitride semiconductor such as gallium nitride, and a compound semiconductor such as silicon carbide and gallium arsenide can be given.

The semiconductor used for the transistor 101 is preferably a purified oxide semiconductor in which impurities serving as electron donors (donors), such as water or hydrogen, are reduced and oxygen vacancies are reduced. The oxide semiconductor which is highly purified is an i-type (intrinsic) semiconductor or a substantially i-type semiconductor. Therefore, a transistor including the oxide semiconductor has a characteristic of significantly small off-state current. Furthermore, the band gap of the oxide semiconductor is 2 eV or more, preferably 2.5 eV or more, further preferably 3.0 eV or more. With the use of the oxide semiconductor film which is purified by sufficiently reducing the concentration of impurities such as moisture or hydrogen and by reducing oxygen vacancies, the off-state current of the transistor can be significantly reduced.

Specifically, the small off-state current of the transistor in which a highly purified oxide semiconductor is used can be demonstrated in various experiments. For example, even when an element has a channel width of $1 \times 10^6$ μm and a channel length of 10 μm, off-state current can be less than or equal to the measurement limit of a semiconductor parameter analyzer, i.e., less than or equal to $1 \times 10^{-13}$ A, at voltage (drain voltage) between a source and a drain of from 1 V to 10 V. In this case, it can be found that an off current density corresponding to a value obtained by dividing the off current by the channel width of the transistor is less than or equal to 100 zA/μm. In addition, a capacitor and a transistor were connected to each other and an off current density was measured by using a circuit in which charge flowing into or from the capacitor was controlled by the transistor. In the measurement, the highly-purified oxide semiconductor film was used as a channel formation region in the transistor, and the off current density of the transistor was measured from change in the amount of charge of the capacitor per unit time. As a result, it was found that, in the case where the voltage between the source and the drain of the transistor is 3 V, a smaller off-state current density of several tens of yA/μm was obtained. Consequently, it can be said that a transistor whose channel formation region is formed in a purified oxide semiconductor film has much smaller off-state current than a transistor including silicon.

By the use of the transistor which has a channel in an oxide semiconductor film as the transistor 101, the amount of charge that leaks through the transistor 101 can be made extremely small even when the transistor 101 is turned off after the potential of the node N1 is kept constant. Thus, the potential of the node N1 can be kept for a long period by turning off the transistor 101 after the potential of the node N1 is kept.

Further, by the use of a transistor which has a channel in an oxide semiconductor film as each of the transistor 102 and the transistor 103, the amount of charge that leaks through the transistor 102 or the transistor 103 can be made extremely small even when the transistor 102 or the transistor 103 is turned off after the potential of the node N2 is kept constant. Thus, power consumption in the power control circuit 201 can be reduced by turning off the transistor 102 or the transistor 103 after the potential of the node N2 is kept.

The transistor 102 and the transistor 103 each can be a transistor which has a channel in a layer or a substrate including a semiconductor other than an oxide semiconductor. For example, the transistor can be a transistor which has a channel in a silicon layer or a silicon substrate.

Note that the transistors 101, 102, and 103 may each be a transistor in which upper and lower gates are provided with an oxide semiconductor layer provided therebetween. A control signal for controlling an on state and an off state of the transistor is supplied to one of the gates, and the other of the gates may be electrically insulated to be in a floating state, or may be in a state where a potential is supplied from another element. In the latter case, potentials with the same level may be supplied to the pair of electrodes, or a fixed potential such as a ground potential may be supplied only to the other of the gate electrodes. By controlling the level of potential supplied to the other of the gate electrodes, the threshold voltage of the transistors can be controlled.

(Operation of Power Supply Control Circuit)

Figure 2A:
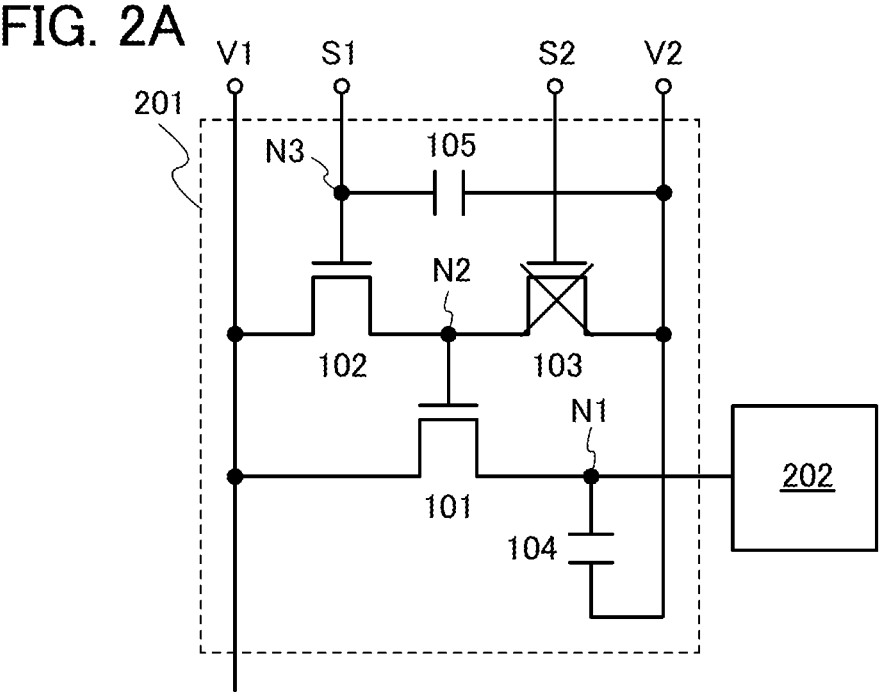
FIGS. 2A and 2B each illustrate operation of the power supply control circuit.
Figure 2B:
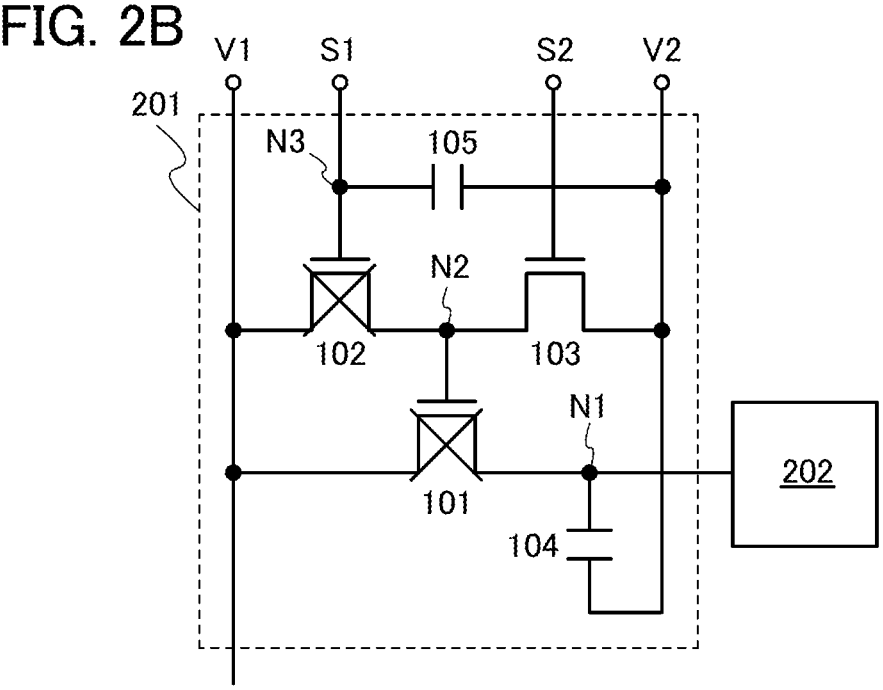

Next, description is made on, with reference to FIGS. 2A and 2B, a method for driving the power supply control circuit 201 in the case where after power supply to the processor 202, the supply of power is stopped in order to reduce power consumption and then power is re-supplied.

(Normal Operation)

FIG. 2A illustrates normal operation of the power supply control circuit 201. FIG. 2A illustrates the state in which power (a high-level potential of the first power line V1) is supplied to the processor 202. The gate of the transistor 102 is supplied with a high-level potential as the control signal S1, so that the transistor 102 is turned on. Further, the gate of the transistor 103 is supplied with a low-level potential as the control signal S2, so that the transistor 103 is turned off. Thus, the potential of the node N2 becomes the high-level potential and the high-level potential is applied to the gate of the transistor 101, so that the transistor 101 is turned on. Accordingly, the high-level potential of the first power line V1 is applied to the processor 202.

(Operation of Stopping Power Supply to Circuit Block)

FIG. 2B illustrates operation of stopping power supply to the processor 202. The gate of the transistor 102 is supplied with a low-level potential as the control signal S1, so that the transistor 102 is turned off. Further, the gate of the transistor 103 is supplied with a high-level potential as the control signal S2, so that the transistor 103 is turned on. Thus, the potential of the node N2 becomes the low-level potential, and the gate of the transistor 101 is supplied with the low-level potential, so that the transistor 101 is turned off.

In the power supply control circuit 201 of this embodiment, a transistor with extremely small off-state current is used as the transistor 101. Thus, current flowing to the processor 202 from the first power line V1 can be blocked by turning off the transistor 101. Thus, power consumed in the processor 202 can be reduced. In this manner, the power supply control circuit 201 can function as a power gating switch.

(Resumption of Normal Operation)

When the normal operation is resumed in the processor 202, as shown in FIG. 2A, the gate of the transistor 102 is supplied with a high-level potential as the control signal S1, so that the transistor 102 is turned on. Further, the gate of the transistor 103 is supplied with a low-level potential as the control signal S2, so that the transistor 103 is turned off. Accordingly, the potential of the node N3 becomes the high-level potential, and the high-level potential is applied to the gate of the transistor 101, so that the transistor 101 is turned on. In this manner, the high-level potential of the first power line V1 is applied to the processor 202, and normal operation is resumed.

This embodiment can be implemented in combination with another embodiment as appropriate.

(Embodiment 2)

In this embodiment, description is made, with reference to FIG. 3, FIGS. 4A and 4B, FIGS. 5A to 5D, and FIG. 6, on a method for driving a signal processing circuit 200 in the case where power supply is suddenly stopped after the power is supplied to the processor 202.

Figure 3:
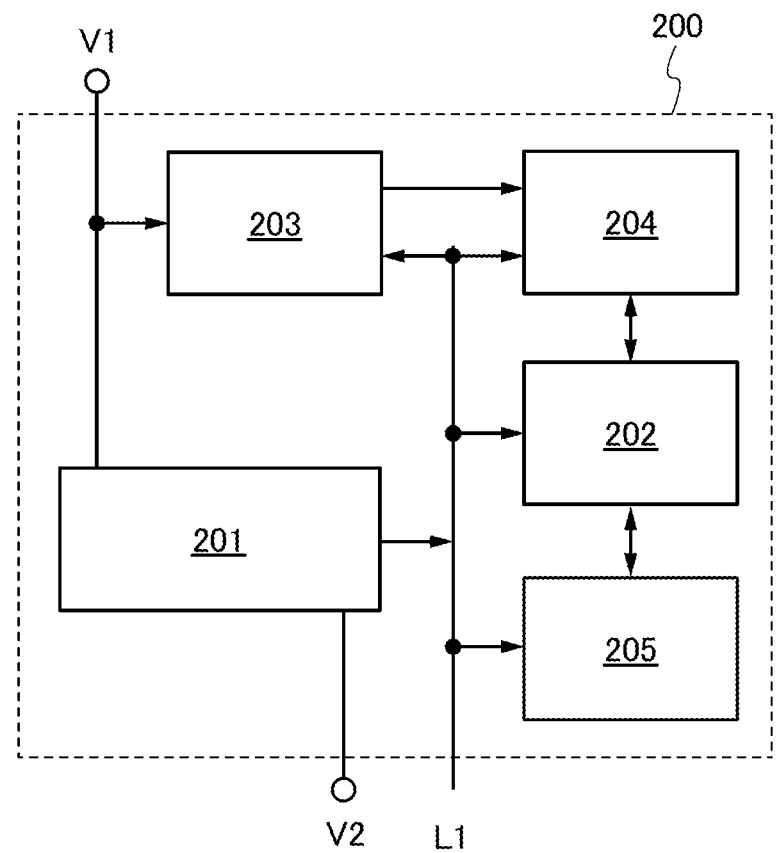
FIG. 3 is a block diagram illustrating a signal processing circuit.

FIG. 3 illustrates a block diagram of the signal processing circuit 200 including the power supply control circuit 201. The signal processing circuit 200 includes the power supply control circuit 201, the processor 202, a detection circuit 203, a processor 204, and a non-volatile memory device 205. Here, the processor 202 is a main processor for controlling operation of electronic devices including the signal processing circuit 200. The processor 204 is a sub-processor that operates when power supply to the electronic devices is stopped. Further, the detection circuit 203, the processor 204, the memory device 205, and the processor 202 are connected to each other through wirings (e.g. a wiring L1).

The processor 202 includes one or a plurality of volatile memory devices such as a cache memory or a register.

The memory device 205 includes one or a plurality of nonvolatile memory devices such as a ROM, an EEPROM, a flash memory, a magnetic disk, or an optical disk. The memory device 205 stores a program for operating the main processor 202 and a program for operating the sub-processor 204. Further, the memory device 205 is used as a work memory for temporarily storing various data when the main processor 202 and the sub-processor 204 execute the programs. Furthermore, when power supply is suddenly stopped during operation of the main processor 202, the memory device 205 is used as a memory for storing data that is held in the processor 202.

The detection circuit 203 is electrically connected to the first power line V1, and detects whether the potential of the first power line V1 is a high-level potential or a low-level potential. Further, the detection circuit 203 transmits to the sub-processor 204 a first detection signal S3 or a second detection signal S4 which is generated on the basis of the detected potential. When detecting a change in the potential of the first power line V1 from the high-level potential to the low-level potential, the detection circuit 203 transmits the first detection signal S3 to the processor 204. When detecting a change in the potential of the first power line V1 from the low-level potential to the high-level potential, the detection circuit 203 transmits the second detection signal S4 to the processor 204.

The processor 204 operates independently of the operation of the processor 202. Further, the processor 204 can operate even when power supply is stopped. When receiving the first detection signal S3 that is transmitted from the detection circuit 203, the processor 204 gives a backup instruction to the processor 202 so that the data held in the main processor 202 is backed up to the memory device 205. When receiving the second detection signal S4 that is transmitted from the detection circuit 203, the processor 204 gives a load instruction to the processor 202 and the memory device 205 so that the data held in the memory device 205 is loaded into the processor 202.

The power supply control circuit that is described in Embodiment 1 can be used for the power supply control circuit 201.

(Operation Method of Signal Processing Circuit 200)

Next, an operation method of the signal processing circuit 200 is described with reference to FIGS. 4A and 4B and FIGS. 5A to 5D.

(Sudden Stop of Power Supply)

As illustrated in the flow chart in FIG. 4A, power supplied to the signal processing circuit 200 is suddenly stopped (Step S301). Thus, the first potential of the first power line V1 is changed from the high-level potential to the low-level potential (Step S302). Then, the power supply control circuit 201 operates (Step S303).

Figure 5A:
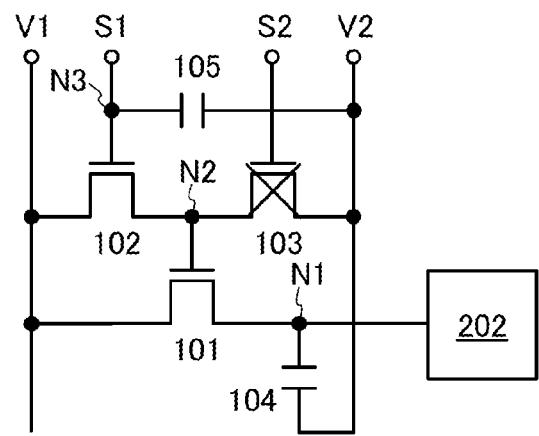
FIG. 5A, FIG. 5B, and FIG. 5C each illustrate operation of the power supply control circuit

FIG. 5A illustrates the power supply control circuit 201 at the moment the power supply is suddenly stopped. When the power supply is suddenly stopped, the potential supplied to the gate of the transistor 102 is changed from the high-level potential to the low-level potential, so that the transistor 102 is turned off. At this time, the transistor 101 cannot be completely turned off when the transistor 102 is turned off with charge remaining in the node N2.

Figure 5D:
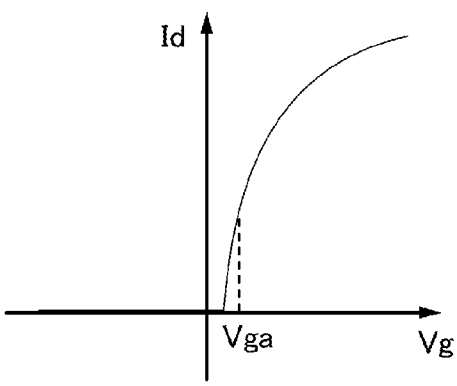
FIG. 5D is a graph showing electric characteristics of the transistor.

FIG. 5D is a graph showing electric characteristics of the transistor 101. For example, when the charge remains in the node N2, Vga that is a positive potential is applied to the gate of the transistor 101. Thus, the transistor 101 cannot be turned off. Accordingly, leakage current flows through the transistor 101 and the potential of the node N1 changes; thus, operation of the processor 202 cannot be maintained.

Figure 5B:
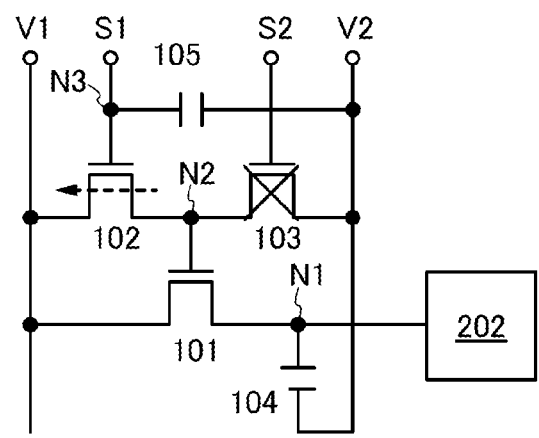

However, as shown in FIG. 5B, the potential of the gate of the transistor 102 is kept by the node N3 to which the one of the pair of electrodes of the capacitor 105 is connected. Thus, the positive potential continues to be applied to the gate of the transistor 102, so that timing at which the transistor 102 is turned off can be delayed. The charge that remains in the node N2 is moved to the first power line V1 until the transistor 102 is turned off, whereby the potential of the node N2 is changed to the low-level potential. Consequently, the transistor 101 can be turned off.

A transistor which has a channel in an oxide semiconductor film is used as the transistor 101. The transistor has extremely small off-state current, so that the potential of the node N1 held by the capacitor 104 can be kept for a long period. Thus, the change in the potential of the node N1 can be prevented.

Figure 5C:
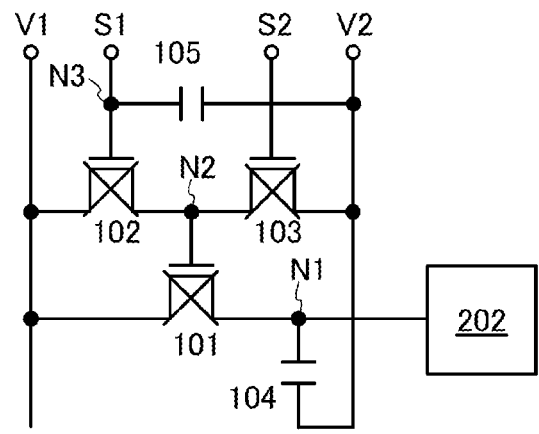

A high-level potential that is the potential at the time of the power supply is kept in the node N1, so that power is continuously supplied to the processor 202 (see FIG. 5C).

When the potential of the first power line V1 is changed from the high-level potential to the low-level potential, the change in the potential is detected by the detection circuit 203. Note that when the high-level potential is held in the node N1, a wiring L1 is also kept at the high-level potential. Thus, the detection circuit 203 is supplied with power from the wiring L1. When the change in the potential is detected by the detection circuit 203, the first detection signal S3 is generated in the detection circuit 203 and is transmitted to the processor 204 (see Step S304 in FIG. 4A).

When receiving the first detection signal S3, the processor 204 gives a backup instruction to the processor 202 so that the data held in the processor 202 is backed up to the memory device 205 (see Step S305 in FIG. 4A).

The processor 202 that has received the backup instruction transfers the data from the processor 202 and stores it in the memory device 205 (see Step S306 in FIG. 4A).

When the data is stored in the memory device 205, the memory device 205 transmits notification of the completion of the backup to the processor 204 (see Step S307 in FIG. 4A), so that the signal processing circuit 200 is brought into a standby mode (see Step S308 in FIG. 4A).

(Operation of Power Supply Restoration)

As shown in the flow chart in FIG. 4B, the power supply to the signal processing circuit 200 is resumed (see Step S311). Thus, the first potential of the first power line V1 is changed from the low-level potential to the high-level potential (see Step S312). At this time, the control signal S1 is also changed from the low-level potential to the high-level potential, so that the transistor 102 is turned on. Further, the low-level potential is applied to the gate of the transistor 103 as the control signal S2, so that the transistor 103 is turned off. Thus, the potential of the node N2 becomes the high-level potential, and the high-level potential is applied to the gate of the transistor 101, so that the transistor 101 is turned on. In such a manner, the high-level potential of the first power line V1 is applied to the processor 202 (see Step S313).

When the potential of the first power line V1 is changed from the low-level potential to the high-level potential, change in the potential is detected by the detection circuit 203. When detecting the change in the potential, the detection circuit 203 generates the second detection signal S4 and transmits it to the processor 204 (Step S314).

When receiving the second detection signal S4, the processor 204 gives a load instruction to the processor 202 and the memory device 205 so that the data held in the memory device 205 is loaded into the processor 202 (Step S315). Then, the data in the memory device 205 is loaded into the processor 202 (Step S316).

Thus, the data restoration in the signal processing circuit 200 is completed (Step S317).

In the signal processing circuit 200, the provision of the power supply control circuit 201 enables the data to be rapidly transferred to the memory device 205 from the processor 202 even when the power supply to the signal processing circuit 200 is suddenly stopped, so that a loss of data in the processor 202 can be prevented.

During power gating, even when the power supply is suddenly stopped, the data held in the processor 202 can be rapidly saved in the memory device 205, so that a loss of data stored in the processor 202 can be prevented.

For example, in the case where a transistor including silicon is used as the transistor 101 in the power supply control circuit 201, the off-state current thereof is 1 pA. In the case where the capacitance of the capacitor 104 is, for example, 1 pF, the node N1 holds the power supply potential (e.g., VDD) with a change less than 1 mV for only 1 millisecond. Thus, the operation of the processor 202 is promptly stopped when the power supply from the first power line is suddenly stopped, so that the data is lost.

However, in one embodiment of the present invention, since the transistor including an oxide semiconductor is used as the transistor 101 in the power supply control circuit 201, the off-state current thereof can be 100 yA. In the case where the capacitance of the capacitor 104 is, for example, 1 pF, the node N1 holds the power supply potential with a change less than 1 mV for $10^7$ seconds. The data in the processor 202 is held in the nonvolatile memory device 205; thus, the data in the processor 202 can be prevented from being lost even when the power supply is suddenly stopped.

Note that FIG. 1 described in Embodiment 1 illustrates a part of the signal processing circuit 200 in FIG. 3. Thus, operation of stopping power supply to the processor 202, which is described in Embodiment 1, can be referred to for the case of intentionally stopping the power supply to the processor 202 in the signal processing circuit 200 in FIG. 3.

As described above, the power supply control circuit 201 not only performs power supply to the processor 202 or intentionally stops power supply but also is able to hold the power supply potential so as to prevent a loss of data in the processor 202 when power supply is suddenly stopped. By utilizing the power supply potential held by the power supply control circuit 201, data in the processor 202 is saved in the nonvolatile memory device 205, so that a loss of data in the processor 202 can be prevented. As described above, the power supply control circuit 201 functions as a power gating switch and a circuit for holding the power supply potential in the case where power supply is suddenly stopped.

(Embodiment 3)

Figure 6:
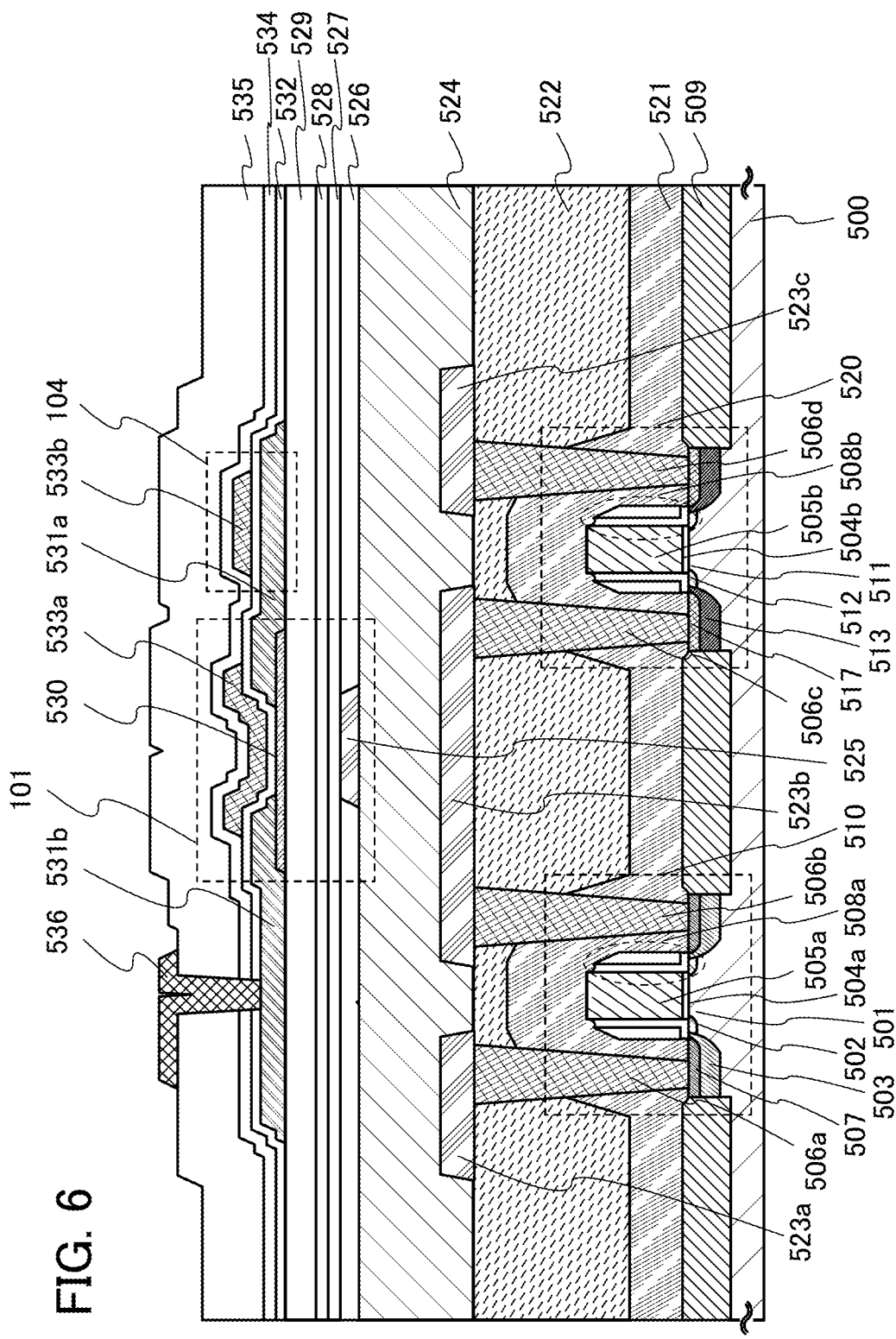
FIG. 6 illustrates a part of a cross section of the power supply control circuit.

In this embodiment, a part of a cross section of the power supply control circuit that is described in the above embodiments will be described with reference to FIG. 6. FIG. 6 illustrates a structure in which the transistor 101 and the capacitor 104 which are included in the power supply control circuit 201 are stacked over transistors 510 and 520 which are included in the processor 202 shown in FIG. 3.

Note that description is made on the case where the transistor 101 and the transistor 510 are n-channel transistors and the transistor 520 is a p-channel transistor.

First, description is made on the transistor 510 and the transistor 520 which are formed in the lower portion.

An n-channel transistor 510 includes a channel formation region 501 provided in a substrate 500 including a semiconductor material, low-concentration impurity regions 502 and high-concentration impurity regions 503 (collectively simply referred to as impurity regions) with the channel formation region 501 provided between the impurity regions, intermetallic compound regions 507 provided in contact with the impurity regions, a gate insulating layer 504a provided over the channel formation region 501, a gate electrode layer 505a provided over the gate insulating layer 504a, and a source electrode layer 506a and a drain electrode layer 506b provided in contact with the intermetallic compound regions 507. Sidewall insulating layers 508a are provided on side surfaces of the gate electrode layer 505a. An insulating layer 521 and an insulating layer 522 are provided to cover the transistor 510. The source electrode layer 506a and the drain electrode layer 506b are connected to the intermetallic compound regions 507 through openings formed in the insulating layer 521 and the interlayer insulating layer 522.

An impurity imparting n-type conductivity is added to the low-concentration impurity regions 502 and the high-concentration impurity regions 503. As the impurity element which imparts n-type conductivity, phosphorus, arsenic, or the like can be used.

A p-channel transistor 520 includes a channel formation region 511 provided in the substrate 500 including the semiconductor material, low-concentration impurity regions 512 and high-concentration impurity regions 513 (collectively simply referred to as impurity regions in some cases) with the channel formation region 511 provided between the impurity regions, intermetallic compound regions 517 provided in contact with the impurity regions, a gate insulating layer 504b provided over the channel formation region 511, a gate electrode layer 505b provided over the gate insulating layer 504b, and a source electrode layer 506c and a drain electrode layer 506d provided in contact with the intermetallic compound regions 517. Sidewall insulating layers 508b are provided on side surfaces of the gate electrode layer 505b. The insulating layer 521 and the insulating layer 522 are provided to cover the transistor 520. The source electrode layer 506c and the drain electrode layer 506d are connected to the intermetallic compound regions 517 through openings formed in the insulating layer 521 and the insulating layer 522.

An impurity imparting p-type conductivity is added to the low-concentration impurity regions 512 and the high-concentration impurity regions 513. As an impurity element imparting p-type conductivity, boron, aluminum, gallium, or the like can be used.

Further, element separation insulating films 509 are provided for the substrate 500 to surround each of the transistor 510 and the transistor 520.

As the substrate 500, a glass substrate, a ceramic substrate, a quartz substrate, a sapphire substrate, or the like can be used, for example. Alternatively, a single crystal semiconductor substrate or a polycrystalline semiconductor substrate made of silicon, silicon carbide, or the like or a compound semiconductor substrate such as a GaAs substrate, an InP substrate, a GaN substrate, a SiC substrate, a GaP substrate, a GaInAsP substrate, or a ZnSe substrate can be used.

Although the case where the channels of the transistors 510 and 520 are formed in the semiconductor substrate is illustrated in FIG. 6, the channels of the transistors 510 and 520 may be formed in a semiconductor film formed over an insulating surface.

The semiconductor film is formed using amorphous silicon, polycrystalline silicon, single crystal silicon, or the like. Amorphous silicon is formed by a CVD method, a sputtering method, or the like. Polycrystalline silicon is formed by crystallizing amorphous silicon with a laser beam. Single crystal silicon is formed in such a manner that hydrogen ions are implanted into a single crystal silicon substrate and then a surface portion of the single crystal silicon substrate is separated.

When the transistors 510 and 520 are formed using a single crystal semiconductor substrate as the semiconductor substrate, the transistors 510 and 520 can operate at high speed. Although not shown in FIG. 6, it is preferable that the processor 202, the processor 204, and the detection circuit 203 which are described in the above embodiments be also formed over the single crystal semiconductor substrate.

The sidewall insulating layers 508a and 508b are provided on side surfaces of the gate electrode layers 505a and 505b formed over the gate insulating layers 504a and 504b, respectively. The low-concentration impurity regions 502 and the high-concentration impurity regions 503 which have different impurity concentrations can be formed in a self-aligned manner by using the gate electrode layer 505a and the sidewall insulating layers 508a as masks when an n-type impurity is added to the substrate 500. Further, the low-concentration impurity regions 512 and the high-concentration impurity regions 513 which have different impurity concentrations can be formed in a self-aligned manner by using the gate electrode layer 505b and the sidewall insulating layers 508b as masks when a p-type impurity is added to the substrate 500.

The gate insulating layers 504a and 504b are each formed using silicon oxide, silicon nitride, silicon oxynitride, silicon nitride oxide, or the like by a CVD method, a sputtering method, a thermal oxidation method, or the like.

The gate electrode layers 505a and 505b are each formed using a metal material such as molybdenum, titanium, tantalum, tungsten, aluminum, copper, chromium, neodymium, or scandium or an alloy material containing any of these materials as a main component by a sputtering method, or a CVD method.

The sidewall insulating layers 508a and the sidewall insulating layers 508b are formed using silicon oxide, silicon oxynitride, silicon nitride, silicon nitride oxide, or the like by a CVD method, a sputtering method, or the like. FIG. 6 shows that the case where the sidewall insulating layers 508a and the sidewall insulating layers 508b are each formed of a stacked-layer structure.

The insulating layers 521 and 522 are each formed using silicon oxide, silicon nitride, silicon oxynitride, silicon nitride oxide, or the like by a CVD method, a sputtering method, or the like. Alternatively, the insulating layers 521 and 522 may be formed using silicon oxide formed by a low temperature oxidation (LTO) method. Further alternatively, silicon oxide with favorable step coverage, which is formed by reacting tetraethyl ortho-silicate (TEOS), silane, or the like with oxygen, nitrous oxide, or the like can be used. Note that the insulating layer 522 is preferably subjected to polishing treatment (e.g., a chemical mechanical polishing (CMP method)), a dry etching method, or plasma treatment so as to increase the planarity of the surface of the insulating layer 522.

The source electrode layer 506a, the drain electrode layer 506b, the source electrode layer 506c, and the drain electrode layer 506d are formed using a metal material such as molybdenum, titanium, tantalum, tungsten, aluminum, copper, chromium, neodymium, or scandium or an alloy material containing any of these materials as a main component by a sputtering method, or a PECVD method.

Wiring layers 523a, 523b, and 523c are formed over the insulating layer 522. The description of the source electrode layer 506a and the like can be referred to as for the wiring layers 523a, 523b, and 523c.

An insulating layer 524 is formed over the wiring layers 523a, 523b, and 523c. The description of the insulating layer 521 and the like can be referred to as for the insulating layer 524.

An electrode layer 525 is formed over the insulating layer 524. The electrode layer 525 functions as the gate of the transistor 101. The description of the source electrode layer 506a and the like can be referred to as for the electrode layer 525.

An insulating layer 526 is formed so as to be in contact with the electrode layer 525. The insulating layer 526 is formed in such a manner that an insulating film is formed over the electrode layer 525 and then subjected to a polishing method such as a CMP method, a dry etching process, or a plasma treatment until the top surface of the electrode layer 525 is exposed.

An insulating layer 527, and insulating layer 528, and an insulating layer 529 are formed over the electrode layer 525 and the insulating layer 526. The insulating layers 526 to 529 are formed using the same material and the same method as those of the insulating layers 521 and 522. In this embodiment, an example of forming three insulating layers over the electrode layer 525 and the insulating layer 526 is described; however, the number of insulating layers may be one, two, or four or more.

An oxide semiconductor layer 530 is formed over the insulating layer 529.

The oxide semiconductor layer 530 preferably contains at least indium (In) or zinc (Zn). As a stabilizer for reducing variation in electric characteristics of a transistor including the oxide semiconductor, it is preferable that one or more selected from gallium (Ga), tin (Sn), hafnium (Hf), aluminum (Al), and zirconium (Zr) be contained.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

For example, indium oxide; gallium oxide; tin oxide; zinc oxide; a binary metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a ternary metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; or a quaternary metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used as an oxide semiconductor.

Note that an In—Ga—Zn-based oxide, for example, means an oxide containing In, Ga, and Zn, and there is no limitation on the ratio of In, Ga, and Zn. Further, the In—Ga—Zn-based oxide may contain a metal element other than In, Ga, and Zn. The In—Ga—Zn-based oxide has sufficiently high resistance when there is no electric field and can realize a sufficiently small off-state current. Moreover, the In—Ga—Zn-based oxide has high mobility For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

For example, with an In—Sn—Zn-based oxide, high mobility can be realized relatively easily. However, even with an In—Ga—Zn-based oxide, mobility can be increased by reducing the defect density in the bulk.

A structure of an oxide semiconductor film is described below.

An oxide semiconductor film is classified roughly into a non-single-crystal oxide semiconductor film and a single-crystal oxide semiconductor film. The non-single-crystal oxide semiconductor film includes any of a c-axis aligned crystalline oxide semiconductor (CAAC-OS) film, a polycrystalline oxide semiconductor film, a microcrystalline oxide semiconductor film, an amorphous oxide semiconductor film, and the like.

First, the CAAC-OS film is described.

The CAAC-OS film is one of oxide semiconductor films including a plurality of crystal parts, and most of each crystal part fits inside a cube whose one side is less than 100 nm. Thus, there is a case where a crystal part included in the CAAC-OS film fits a cube whose one side is less than 10 nm, less than 5 nm, or less than 3 nm.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle ($2\theta$) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when $2\theta$ is around 56°. This peak is derived from the (110) plane of the $InGaZnO_4$ crystal. Here, analysis ($\varphi$ scan) is performed under conditions where the sample is rotated around a normal vector of a sample surface as an axis ($\varphi$ axis) with $2\theta$ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when $\varphi$ scan is performed with $2\theta$ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned with a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases.

Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of $2\theta$ may also be observed at around 36°, in addition to the peak of $2\theta$ at around 31°. The peak of $2\theta$ at around 36° indicates that a crystal having no c-axis alignment is included in part of the CAAC-OS film. It is preferable that in the CAAC-OS film, a peak of $2\theta$ appear at around 31° and a peak of $2\theta$ do not appear at around 36°.

The CAAC-OS film is an oxide semiconductor film having a low impurity concentration. The impurity means an element other than main components of the oxide semiconductor film, such as hydrogen, carbon, silicon, or a transition metal element. In particular, an element (e.g., silicon) having higher strength of bonding to oxygen than a metal element included in the oxide semiconductor film takes oxygen away in the oxide semiconductor film to disrupt the atomic arrangement in the oxide semiconductor film, which causes a lowering of the crystallinity of the oxide semiconductor film. A heavy metal such as iron or nickel, argon, carbon dioxide, or the like has a large atomic radius (or molecular radius), and thus disrupts the atomic arrangement in the oxide semiconductor film when included in the oxide semiconductor film, which causes a lowering of the crystallinity of the oxide semiconductor film. Note that the impurity included in the oxide semiconductor film serves as a carrier trap or a carrier generation source in some cases.

The CAAC-OS film is an oxide semiconductor film having a low density of defect states. For example, oxygen vacancies in the oxide semiconductor film serve as carrier traps or serve as carrier generation sources when hydrogen is captured therein.

The state in which impurity concentration is low and density of defect states is low (few oxygen vacancies) is referred to as "highly purified intrinsic" or "substantially highly purified intrinsic". A highly purified intrinsic or substantially highly purified intrinsic oxide semiconductor film has few carrier generation sources, and thus has a low carrier density. Thus, a transistor including the oxide semiconductor film rarely has a negative threshold voltage (rarely has normally-on characteristics). A highly purified intrinsic or substantially highly purified intrinsic oxide semiconductor film has few carrier traps. Thus, the transistor including the oxide semiconductor film has a small variation in electrical characteristics and accordingly has high reliability. Charge trapped by the carrier traps in the oxide semiconductor film take a long time to be released and may behave like fixed charge. Thus, the transistor including the oxide semiconductor film with a low impurity concentration and a high density of defect states has unstable electrical characteristics in some cases.

With the use of the CAAC-OS film in a transistor, variation in the electrical characteristics of the transistor due to irradiation with visible light or ultraviolet light is small.

Next, a microcrystalline oxide semiconductor film will be described.

In an image obtained with a TEM, for example, crystal parts cannot be found clearly in the microcrystalline oxide semiconductor film in some cases. In most cases, the size of a crystal part included in the microcrystalline oxide semiconductor film is greater than or equal to 1 nm and less than or equal to 100 nm, or greater than or equal to 1 nm and less than or equal to 10 nm, for example. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as an nc-OS (nanocrystalline oxide semiconductor) film. In an image of the nc-OS film obtained with a TEM, for example, a boundary between crystal parts is not clearly detected in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. However, there is no regularity of crystal orientation between different crystal parts in the nc-OS film; thus, the orientation of the whole film is not observed. Accordingly, in some cases, the nc-OS film cannot be distinguished from an amorphous oxide semiconductor depending on an analysis method. For example, when the nc-OS film is subjected to structural analysis by an out-of-plane method with an XRD apparatus using an X-ray having a diameter larger than that of a crystal part, a peak which shows a crystal plane does not appear. Further, a halo pattern is shown in an electron diffraction image (also referred to as a selected-area electron diffraction area) of the nc-OS film obtained by using an electron beam having a probe diameter (e.g., larger than or equal to 50 nm) larger than that of a crystal part. Meanwhile, spots are shown in a nanobeam electron diffraction image of the nc-OS film obtained by using an electron beam having a probe diameter (e.g., larger than or equal to 1 nm and smaller than or equal to 30 nm) close to, or smaller than or equal to that of a crystal part. Further, in a nanobeam electron diffraction image of the nc-OS film, regions with high luminance in a circular (ring) pattern are shown in some cases. Also in a nanobeam electron diffraction image of the nc-OS film, a plurality of spots are shown in a ring-like region in some cases.

Since the nc-OS film is an oxide semiconductor film having more regularity than the amorphous oxide semiconductor film, the nc-OS film has a lower density of defect states than the amorphous oxide semiconductor film. However, there is no regularity of crystal orientation between different crystal parts in the nc-OS film; hence, the nc-OS film has a higher density of defect states than the CAAC-OS film.

Note that an oxide semiconductor film may be a stacked film including two or more films of an amorphous oxide semiconductor film, a microcrystalline oxide semiconductor film, and a CAAC-OS film, for example.

Note that an impurity is easily trapped in an amorphous oxide semiconductor film; thus, the carrier density of the amorphous oxide semiconductor film tends to be high. Accordingly, relatively high field-effect mobility can be obtained relatively easily.

An oxide semiconductor film is formed over a flat surface, so that crystallinity can be enhanced. The oxide semiconductor film is formed over a surface with the average surface roughness (Ra) of less than or equal to 1 nm, preferably less than or equal to 0.3 nm, more preferably less than or equal to 0.1 nm.

Note that Ra is obtained by three-dimensionally expanding arithmetic average roughness that is defined by JIS B 0601:2001 (ISO4287:1997) so as to be able to be applied to a curved surface. $R_a$ can be expressed as an "average value of the absolute values of deviations from a reference surface to a specific surface" and is defined by the following formula.

$$Ra = \frac{1}{S_0} \int_{y_1}^{y_2} \int_{x_1}^{x_2} |f(x, y) - Z_0| \, dx \, dy \quad \text{[FORMULA 1]}$$

Here, the specific surface is a surface that is a target of roughness measurement, and is a quadrilateral region specified by four points represented by the coordinates $(x_1, y_1, f(x_1, y_1))$, $(x_1, y_2, f(x_1, y_2))$, $(x_2, y_1, f(x_2, y_1))$, and $(x_2, y_2, f(x_2, y_2))$. Moreover, $S_0$ represents the area of a rectangle which is obtained by projecting the specific surface on the xy plane, and $Z_0$ represents the height of the reference surface (the average height of the specific surface). Ra can be measured using an atomic force microscope (AFM).

Therefore, planarizing treatment may be performed on the region of the insulating layer 529 which is in contact with the oxide semiconductor layer 530. As the planarizing treatment, polishing treatment (e.g., chemical mechanical polishing (CMP)), dry-etching treatment, or plasma treatment can be used, though there is no particular limitation on the planarizing treatment.

For the deposition of the CAAC-OS film, the following conditions are preferably used.

By reducing the amount of impurities entering the CAAC-OS film during the deposition, the crystal state can be prevented from being broken by the impurities. For example, the concentration of impurities (e.g., hydrogen, water, carbon dioxide, or nitrogen) existing in a deposition chamber is preferably reduced. Furthermore, the concentration of impurities in a deposition gas is preferably reduced. Specifically, a deposition gas whose dew point is −80° C. or lower, preferably −100° C. or lower is used.

By increasing the substrate heating temperature during the deposition, migration of a sputtered particle is likely to occur after the sputtered particle reaches a substrate surface. Specifically, the substrate heating temperature during the deposition is higher than or equal to 100° C. and lower than or equal to 740° C., preferably higher than or equal to 200° C. and lower than or equal to 500° C. By increasing the substrate heating temperature during the deposition, when the flat-plate-like sputtered particle reaches the substrate, migration occurs on the substrate surface, so that a flat plane of the flat-plate-like sputtered particle is attached to the substrate.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

As an example of the sputtering target, a polycrystalline In—Ga—Zn-based oxide target is described below.

The In—Ga—Zn-based oxide target, which is polycrystalline, is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on the desired sputtering target.

With the use of the CAAC-OS film as the oxide semiconductor layer 530, a transistor in which a change in electrical characteristics of the transistor due to irradiation with visible light or ultraviolet light can be reduced can be obtained.

It is preferable that an impurity such as hydrogen or water not be contained in the oxide semiconductor layer 530 before, during, and after the deposition. For example, it is preferable that hydrogen, water, and the like included in the insulating layer 529 be removed as much as possible, or that the oxide semiconductor layer 530 be deposited so as to contain hydrogen and water as little as possible. Further, after the deposition of the oxide semiconductor layer 530, heat treatment (also referred to as dehydration or dehydrogenation) for reducing hydrogen or water contained in the insulating layer 529 may be performed. Further, in order to reduce hydrogen or water contained in the oxide semiconductor layer 530, it is preferable that the insulating film in contact with the oxide semiconductor layer 530 be formed so as not to contain hydrogen or water as much as possible. Further, after the formation of the insulating film, dehydration or dehydrogenation may be performed.

Further, when a film which prevents hydrogen from passing therethrough is used as one of the insulating layer 527 and the insulating layer 528, hydrogen contained in the transistors 510 and 520 in the lower portion, the insulating film 524, the interlayer insulating film 526, and the like can be prevented from reaching the oxide semiconductor film 530. As the film which prevents hydrogen from passing therethrough, a silicon nitride film, a silicon oxynitride film, an aluminum oxide film, an aluminum oxynitride film, or the like is preferably used. In addition, when a film which prevents hydrogen from passing therethrough is used as an insulating layer 534, hydrogen contained in an insulating layer 535 can be prevented from reaching the oxide semiconductor layer 530.

Treatment for supplying oxygen to the oxide semiconductor layer 530 may be performed in order to reduce oxygen vacancies contained in the oxide semiconductor layer 530. For example, when an insulating film containing an excess amount of oxygen is provided in contact with the oxide semiconductor layer 530 and heat treatment is performed, oxygen can be supplied to the oxide semiconductor layer 530 from the insulating film containing an excess amount of oxygen. Oxygen is supplied to the oxide semiconductor layer 530, whereby oxygen vacancies contained in the oxide semiconductor layer 530 can be reduced. Treatment for adding oxygen to the oxide semiconductor layer 530 may be performed after the oxide semiconductor layer 530 is subjected to dehydration or dehydrogenation treatment. As the treatment for adding oxygen, an oxygen radical, ozone, an oxygen atom, an oxygen ion, or the like is added to the oxide semiconductor layer 530 by an ion implantation method, an ion doping method, plasma treatment, or the like, for example. The treatment for adding oxygen may be performed through the gate insulating layer 532.

As described above, a purified oxide semiconductor (purified OS) can be obtained by reducing impurities such as water or hydrogen which serves as an electron donor (donor) and by reducing oxygen defects. The oxide semiconductor which is highly purified is an i-type (intrinsic) semiconductor or a substantially i-type semiconductor. For this reason, a transistor having a channel formation region in a highly purified oxide semiconductor film can have extremely small off-state current.

By reducing an impurity such as hydrogen or water and oxygen vacancies in the oxide semiconductor layer 530, generation of carriers can be suppressed. Suppressing the increase in carrier density can prevent the threshold voltage of the transistor from shifting in the negative direction. As a result, the threshold voltage of the transistor can be easily controlled by a potential applied to the other of the gate electrodes of the transistor. Thus, the transistor can have high reliability.

A source electrode layer 531a and a drain electrode layer 531b are formed so as to be in contact with the oxide semiconductor layer 530. The source electrode layer 531a functions as the one of the pair of electrodes of the capacitor 104. Further, the drain electrode layer 531b is connected to a wiring layer 536 through an opening formed in the gate insulating layer 532, the insulating layers 534 and 535.

The source electrode layer 531a and the drain electrode layer 531b can be formed using a metal material such as molybdenum, titanium, tantalum, tungsten, aluminum, copper, chromium, neodymium, or scandium or an alloy material containing any of these materials as a main component by a sputtering method, a PECVD method, or the like. Alternatively, the source electrode layer 531a and the drain electrode layer 531b may be formed using a metal nitride material such as tungsten nitride, tantalum nitride, titanium nitride, or molybdenum nitride. Further alternatively, the source electrode layer 531a and the drain electrode layer 531b may be formed using a conductive material such as indium oxide-tin oxide, indium oxide containing tungsten oxide, indium zinc oxide containing tungsten oxide, indium oxide containing titanium oxide, indium tin oxide containing titanium oxide, indium oxide-zinc oxide, or indium tin oxide to which silicon oxide is added.

The source electrode layer 531a and the drain electrode layer 531b each have a projecting region at its lower end portion in a cross-section in the channel length direction. Such a shape can be formed in such a manner that a conductive film is formed over the insulating layer 529 and the oxide semiconductor layer 530 and then is subjected to etching more than once. Since the source electrode layer 531a and the drain electrode layer 531b each have such a shape, the gate insulating layer 532 to be formed later can have favorable coverage.

The gate insulating layer 532 is formed over the oxide semiconductor layer 530, the source electrode layer 531a, and the drain electrode layer 531b.

The gate insulating layer 532 is formed using silicon oxide, gallium oxide, aluminum oxide, aluminum oxynitride, silicon oxynitride, silicon nitride oxide, silicon nitride, or the like by a sputtering method, an MBE method, a plasma CVD method, a pulse laser deposition method, or an ALD method. The gate insulating layer 532 can be formed using a high-k material such as hafnium oxide, yttrium oxide, hafnium silicate ($HfSi_xO_y$ (x>0, y>0)), hafnium silicate to which nitrogen is added ($HfSiO_xN_y$ (x>0, y>0)), hafnium aluminate ($HfAl_xO_y$ (x>0, y>0)), or lanthanum oxide, whereby gate leakage current can be reduced. In addition, the gate insulating layer 532 is formed to have a single-layer structure or a stacked-layer structure using any of the above materials.

A gate electrode layer 533a is formed in a region overlapping with the oxide semiconductor layer 530. An electrode layer 533b is formed in a region overlapping with the source electrode layer 531a. The electrode layer 533b serves as the other of the pair of electrodes of the capacitor 104.

The gate electrode layer 533a and the electrode layer 533b can be formed using a metal material such as molybdenum, titanium, tantalum, tungsten, aluminum, copper, chromium, neodymium, or scandium or an alloy material containing any of these materials as a main component by a sputtering method, a PECVD method, or the like. Alternatively, the gate electrode layer 533a and the electrode layer 533b may be formed using a metal nitride material such as tungsten nitride, tantalum nitride, titanium nitride, or molybdenum nitride. Further alternatively, the gate electrode layer 533a and the electrode layer 533b may be formed using a conductive material such as indium oxide-tin oxide, indium oxide including tungsten oxide, indium zinc oxide including tungsten oxide, indium oxide including titanium oxide, indium tin oxide including titanium oxide, indium oxide-zinc oxide, or indium tin oxide to which silicon oxide is added.

The insulating layers 534 and 535 are formed over the gate electrode layer 533a and the electrode layer 533b. The insulating layers 534 and 535 are formed using the same material and the same method as those of the insulating layers 521 and 522. As described above, a film which prevents hydrogen or water from passing therethrough may be used for at least one of the insulating layers 534 and 535.

An opening reaching the drain electrode layer 531b is formed in the gate insulating layer 532 and the insulating layers 534 and 535, and the wiring layer 536 is provided in the opening. The wiring layer 536 is formed using the same material and the same method as those of the source electrode layer 531a and the drain electrode layer 531b.

Further, an insulating film or a wiring may be further provided over the insulating layer 535 and the wiring layer 536.

Note that in the layer where the transistor 520 is formed, the processor 202, the processor 204, the detection circuit 203, and the like shown in FIG. 3 are formed in addition to the transistor 520. A transistor including a material such as silicon, like the transistor 520, can easily operate at high speed. Thus, arithmetic processing performed in the processor 202 or the processor 204 can be performed at high speed.

When the power supply control circuit 201 described in the above embodiments is formed, the transistor 102 and the transistor 103 included in the power supply control circuit 201 may be formed in the same layer as the transistor 101 and the capacitor 104 or formed over the layer where the transistor 101 and the capacitor 104 are formed (e.g., over the insulating layer 535 and the wiring layer 536) in FIG. 6. Further, the memory device 205 described in the above embodiments may be formed in the same layer as the transistor 101 and the capacitor 104, or may be formed over the layer where the transistor 101 and the capacitor 104 are formed.

A transistor including an oxide semiconductor is easily stacked over another component compared to a transistor including silicon. Thus, the formation of the transistor 102 and the transistor 103 over the layer where the transistor 101 and the capacitor 104 are formed enables the area occupied by the signal processing circuit 200 to be reduced.

Next, the memory device formed using a transistor which has a channel in an oxide semiconductor is described with reference to FIG. 7.

Figure 7:
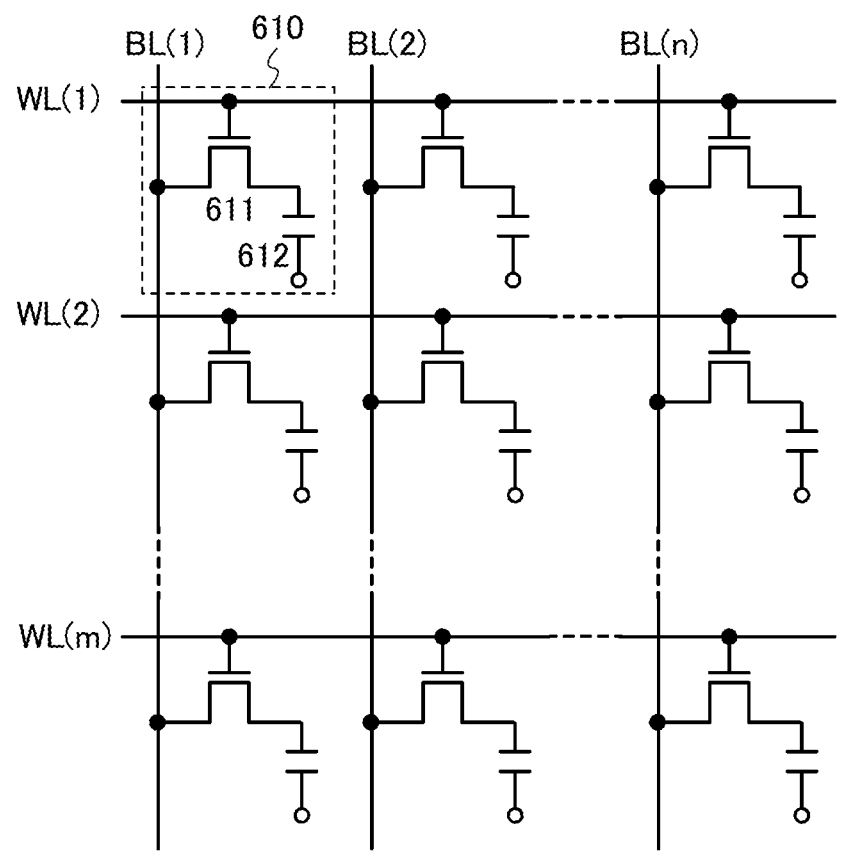
FIG. 7 illustrates a nonvolatile memory device.

The memory device in FIG. 7 includes m word lines WL, n bit lines BL, and a plurality of memory elements 610 arranged in a matrix of m rows (in the vertical direction) and n columns (in the horizontal direction). The memory element 610 includes a capacitor 612 and a transistor 611 which has a channel in an oxide semiconductor.

In the memory element 610, a bit line BL is electrically connected to one of a source and a drain of the transistor 611, a word line WL is electrically connected to a gate of the transistor 611, and the other of the source and the drain of the transistor 611 is electrically connected to one of a pair of electrodes of the capacitor 612.

As described above, the amount of off-state current is extremely small in the transistor which has a channel in an oxide semiconductor. Thus, a potential of the one of the pair of electrodes of the capacitor 612 (or the charge accumulated in the capacitor 612) can be held for a long period by turning off the transistor 611.

Next, writing and holding of data in the memory element 610 is described.

First, the potential of the word line WL is set to a potential at which the transistor 611 is turned on, so that the transistor 611 is turned on. Accordingly, the potential of the bit line BL is supplied to the one of the pair of electrodes of the capacitor 612 (i.e., writing of data). After that, the potential of the word line WL is set to a potential at which the transistor 611 is off, so that the transistor 611 is turned off. Thus, the potential of the one of the pair of electrodes of the capacitor 612 is held (holding).

Since the off-state current of the transistor 611 is extremely small, the potential of the one of the pair of electrodes of the capacitor 612 (or the charge accumulated in the capacitor 612) can be held for a long period.

For example, the potential of the bit line BL after charge redistribution is $(C_B \times V_{B0} + C \times V)/(C_B + C)$, where V is the potential of the first terminal of the capacitor 612, C is the capacitance of the capacitor 612, $C_B$ is the capacitance of the bit line BL (hereinafter also referred to as bit line capacitance), and $V_{B0}$ is the potential of the bit line BL before the charge redistribution. Therefore, it can be found that assuming that the memory element 610 is in either of two states in which the potentials of the first terminal of the capacitor 612 are $V_1$ and $V_0$ ($V_1 > V_0$), the potential of the bit line BL in the case of holding the potential $V_1$ ($=(C_B \times V_{B0} + C \times V_1)/(C_B + C)$) is higher than the potential of the bit line BL in the case of holding the potential $V_0$ ($=(C_B \times V_{B0} + C \times V_0)/(C_B + C)$).

Then, by comparing the potential of the bit line BL with a predetermined potential, data can be read.

As described above, the memory element 610 in FIG. 7 can hold charge that is accumulated in the capacitor 612 for a long time because the off-state current of the transistor 611 is extremely small. In other words, power consumption can be sufficiently reduced because refresh operation becomes unnecessary or the frequency of refresh operation can be extremely low. Moreover, stored data can be stored for a long time even when power is not supplied.

The nonvolatile memory device 205 shown in FIG. 3 can be formed, for example, with the use of a plurality of such memory elements 610. In the case of forming the memory device shown in FIG. 7 over the processor 202 and the like, the transistor 611 and the capacitor 612 included in the memory element 610 can be formed in the same layer as the transistor 101 and the capacitor 104 included in the power supply control circuit 201 shown in FIG. 6. Further, the memory device can be further stacked thereover; thereby integration of the memory device can be improved. Furthermore, the area occupied by the memory device can be reduced.

This embodiment can be implemented in combination with another embodiment as appropriate.

(Embodiment 4)

In this embodiment, a configuration of a processor included in the signal processing circuit according to one embodiment of the present invention, will be described.

Figure 8:
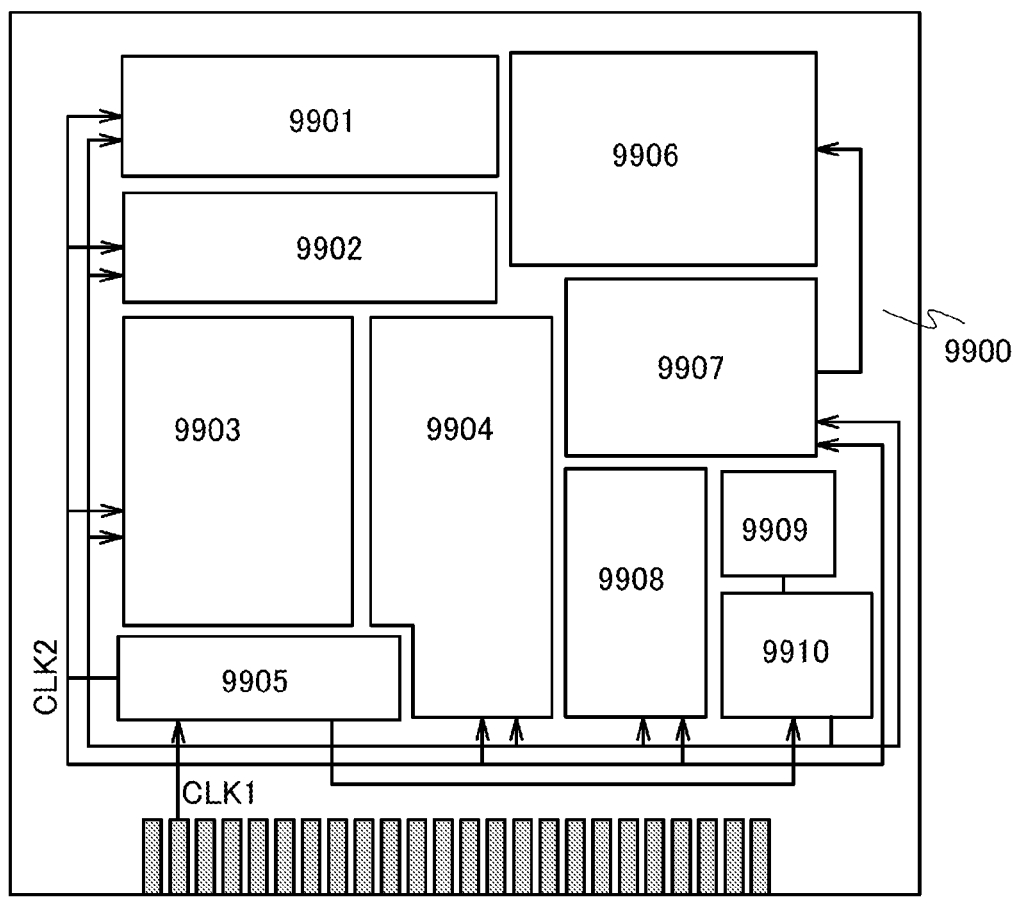
FIG. 8 is a block diagram illustrating a processor.

FIG. 8 shows an example of a configuration of the processor of this embodiment. The processor in FIG. 8 mainly includes, over a substrate 9900, an ALU 9901, an ALU controller 9902, an instruction decoder 9903, an interrupt controller 9904, a timing controller 9905, a register 9906, a register controller 9907, a Bus I/F 9908, a rewritable ROM 9909, and a ROM I/F 9910. Note that "ALU" is an arithmetic logic unit, "Bus I/F" is a bus interface, and "ROM I/F" is a ROM interface. Further, the ROM 9909 and the ROM I/F 9910 may be provided over different chips. It is needless to say that the processor illustrated in FIG. 8 is just an example of the simplified structure, and practical processors have various structures depending on their usages.

The processor illustrated in FIG. 8 can be used as each of the main processor 202 and the sub-processor 204 included in the signal processing circuit 200 described in Embodiment 1. Note that the main processor 202 and the sub-processor 204 do not always have the same configuration.

An instruction which is input to the processor through the Bus I/F 9908 is input to the instruction decoder 9903 and decoded therein, and then, input to the ALU controller 9902, the interrupt controller 9904, the register controller 9907, and the timing controller 9905.

The ALU controller 9902, the interrupt controller 9904, the register controller 9907, and the timing controller 9905 perform various controls on the basis of the decoded instruction. Specifically, the ALU controller 9902 generates signals for controlling operation of the ALU 9901. While the processor is executing a program, the interrupt controller 9904 processes an interrupt request from an external input/output device or a peripheral circuit depending on its priority or a mask state. The register controller 9907 generates an address of the register 9906, and reads/writes data from/to the register 9906 depending on the state of the processor.

The timing controller 9905 generates signals for controlling operation timings of the ALU 9901, the ALU controller 9902, the instruction decoder 9903, the interrupt controller 9904, and the register controller 9907. For example, the timing controller 9905 is provided with an internal clock generator for generating an internal clock signal CLK2 on the basis of a reference clock signal CLK1, and inputs the internal clock signal CLK2 to the above circuits.

For example, the following operation is performed in the case where after power supply to the main processor 202, the supply of power is stopped in order to reduce power consumption and then power is re-supplied. In accordance with an instruction from the ALU 9901, the register controller 9907 gives an instruction to hold data of the register 9906 to the memory device 205. Then, as illustrated in FIG. 2B, the transistor 101 included in the power supply control circuit 201 is turned off, whereby the power supply from the first power line V1 to the processor 202 is stopped. However, the operation of the processor 202 is possible owing to the potential held in the node N1 in the power supply control circuit 201.

In this manner, even in the case where power supply to the processor is temporarily stopped, current can be supplied using the potential held in the power supply control circuit 201; thus, power consumed in the signal processing circuit can be reduced. Specifically, for example, while a user of a personal computer does not input data to an input device such as a keyboard, the operation of the processor can be stopped, so that the power consumption can be reduced.

Although the processor is described as an example in this embodiment, the signal processing circuit of the present invention is not limited to the processor and can be applied to an LSI such as an image processing circuit, a DSP, or an FPGA.

This embodiment can be implemented in combination with another embodiment as appropriate.

[Embodiment 5)

A signal processing circuit according to one embodiment of the present invention is used, so that an electronic device with low power consumption can be provided. In particular, in the case of a portable electronic device which has difficulty in continuously receiving power, when a signal processing circuit with low power consumption according to one embodiment of the present invention is added as a component of the device, an advantage in increasing the continuous operation time can be obtained. Further, with the use of a transistor with small off-state current, redundant circuit design which is needed to cover a failure caused by large off-state current is unnecessary; therefore, the integration degree of the signal processing circuit can be increased, and the signal processing circuit can have higher functionality.

The signal processing circuit according to one embodiment of the present invention can be used for display devices, personal computers, or image reproducing devices provided with recording media (typically, devices which reproduce the content of recording media such as digital versatile discs (DVDs) and have displays for displaying the reproduced images). Other than the above, as an electronic device which can employ the signal processing circuit according to one embodiment of the present invention, mobile phones, portable game machines, portable information terminals, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like can be given.

A case where a signal processing circuit according to one embodiment of the present invention is applied to mobile electronic devices such as a mobile phone, a smartphone, and an electronic book reader is described.

Figure 9:
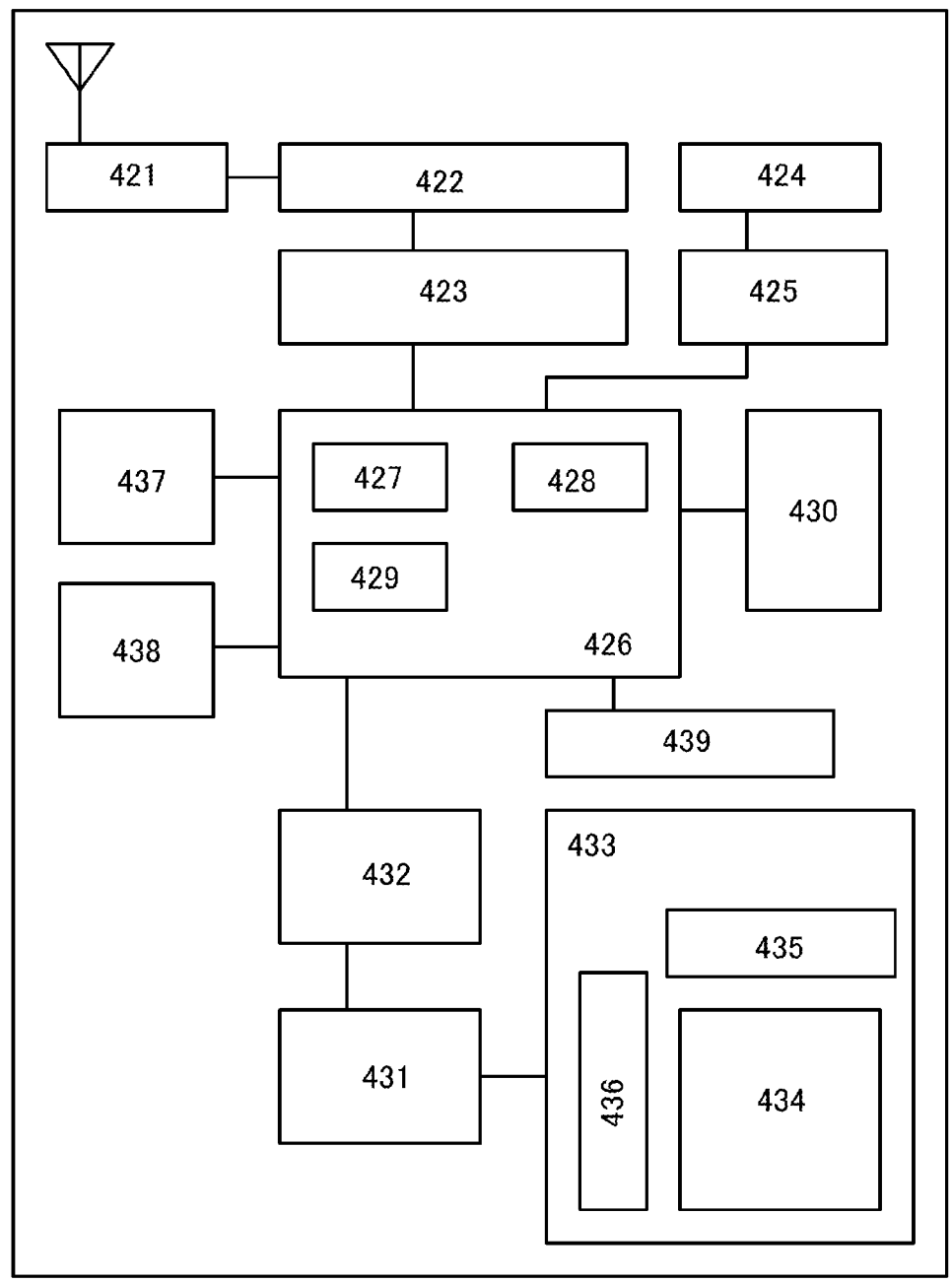
FIG. 9 is a block diagram illustrating a portable electronic device.

FIG. 9 is a block diagram of a portable electronic device. The portable electronic device illustrated in FIG. 9 includes an RF circuit 421, an analog baseband circuit 422, a digital baseband circuit 423, a battery 424, a power supply circuit 425, an application processor 426, a flash memory 430, a display controller 431, a memory circuit 432, a display 433, a touch sensor 439, an audio circuit 437, a keyboard 438, and the like. The display 433 includes a display portion 434, a source driver 435, and a gate driver 436. The application processor 426 includes a DSP 428, an interface 429, and a signal processing circuit 427. The signal processing circuit 200 described in the above embodiment is employed for the signal processing circuit 427, whereby power consumption can be reduced. The memory circuit 432 is generally formed using an SRAM or a DRAM; however, when the memory device shown in FIG. 7 is used as the memory circuit 432, power consumption can be reduced.

Figure 10:
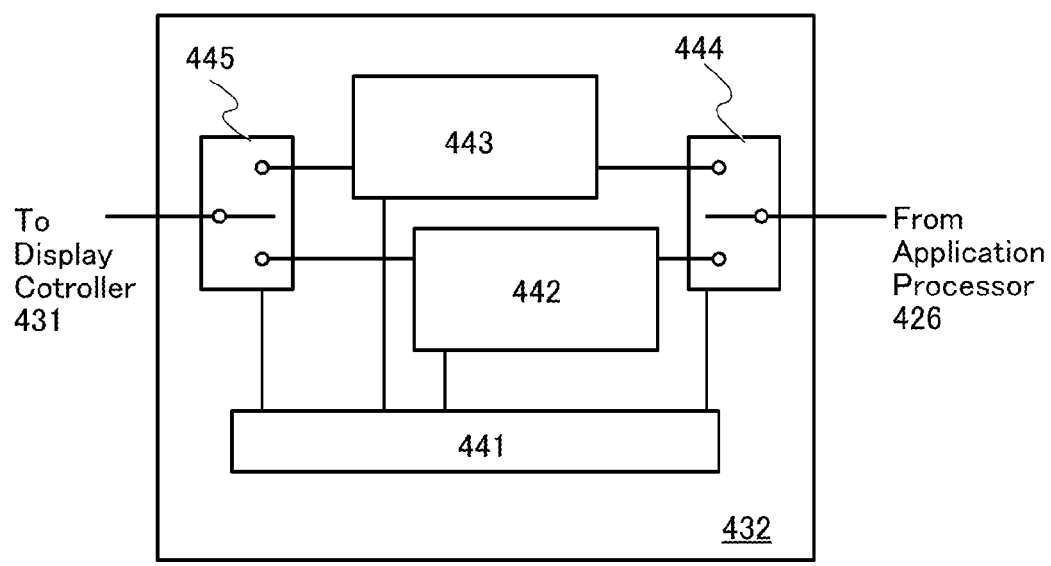
FIG. 10 is a block diagram illustrating a memory circuit.

FIG. 10 is a block diagram of a structure of the memory circuit 432. The memory circuit 432 includes a memory device 442, a memory device 443, a switch 444, a switch 445, and a memory controller 441.

First, image data is received by the portable electronic device or is formed by the application processor 426. The image data is stored in the memory device 442 via the switch 444. The image data output via the switch 444 is sent to the display 433 via the display controller 431. The display 433 displays an image using the image data.

In the case where an image does not change, like in the case of a still image, the image data read out from the memory device 442 continues to be sent to the display controller 431 via the switch 445, generally at a cycle of 30 Hz to 60 Hz. When a user performs switching of an image displayed on the display, the application processor 426 forms new image data and the image data is stored in the memory device 443 via the switch 444. Even when the new image data is stored in the storage device 443, image data is periodically read out from the storage device 442 via the switch 445.

When the storage of the new image data in the memory device 443 is completed, the new data stored in the memory device 443 is read out and sent to the display 433 via the switch 445 and the display controller 431. The display 433 displays an image using the new image data which has been sent.

The reading of the image data is continuously performed until next new image data is stored in the memory device 442. In this manner, the memory device 442 and the memory device 443 alternately perform writing and reading of image data, and the display 433 displays an image.

The memory device 442 and the memory device 443 are not necessarily different memory devices, and a memory region included in one memory device may be divided to be used.

Figure 11:
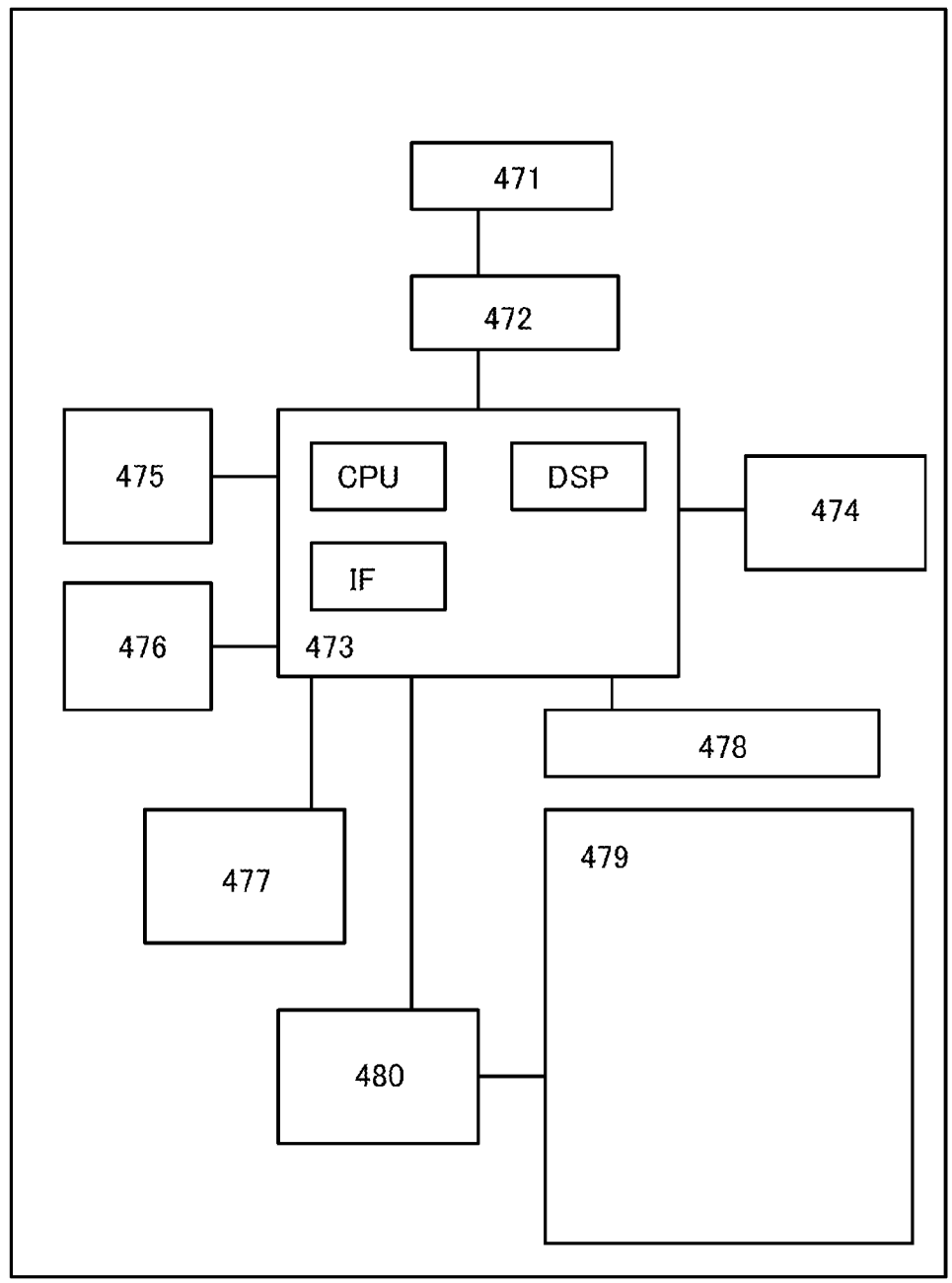
FIG. 11 is a block diagram illustrating an e-book reader.

Next, FIG. 11 is a block diagram of an e-book reader. The e-book reader includes a battery 471, a power supply circuit 472, a microprocessor 473, a flash memory 474, an audio circuit 475, a keyboard 476, a memory circuit 477, a touch panel 478, a display 479, and a display controller 480. The signal processing circuit described in the above embodiment is employed for the microprocessor 473, whereby power consumption can be reduced.

For example, when a user utilizes a function of highlighting which clarifies a difference between a predetermined portion and other portions in book data, for example, by changing the color of the display, underlining, displaying with bold letters, and changing the style of letters in the predetermined portion, the data of the portion which is specified by the user in the book data needs to be stored. The memory circuit 477 has a function of temporary storing the data. Note that when the data is held for a long time, the data may be copied in the flash memory 474.

This embodiment can be implemented in combination with another embodiment as appropriate.

This application is based on Japanese Patent Application serial no. 2012-161932 filed with Japan Patent Office on Jul. 20, 2012, the entire contents of which are hereby incorporated by reference.

What is claimed is:

1. A power supply control circuit comprising:
   a first switching element comprising a first transistor, wherein one of a source and a drain of the first transistor is electrically connected to a first processor, and the other of the source and the drain of the first transistor is electrically connected to a first power line;
   a switching control portion comprising a second transistor and a third transistor, wherein one of a source and a drain of the second transistor is electrically connected to the first power line, the other of the source and the drain of the second transistor and one of a source and a drain of the third transistor are electrically connected to a gate of the first transistor, and the other of the source and the drain of the third transistor is electrically connected to a second power line;
   a first capacitor, a first electrode of the first capacitor electrically connected to the first transistor, and a second electrode of the first capacitor electrically connected to the second power line; and
   a second capacitor, a first electrode of the second capacitor electrically connected to a gate of the second transistor, and a second electrode of the second capacitor electrically connected to the second power line,
   wherein the first transistor has a channel comprising an oxide semiconductor.

2. The power supply control circuit according to claim 1, wherein each of the second transistor and the third transistor has a channel comprising an oxide semiconductor.

3. The power supply control circuit according to claim 1, wherein each of the second transistor and the third transistor has a channel comprising silicon.

4. A signal processing circuit comprising the power supply control circuit according to claim 1, further comprising:
   a detection circuit electrically connected to the first power line;
   a second processor electrically connected to the detection circuit and the first processor; and
   a memory device electrically connected to the first processor.

5. The signal processing circuit according to claim 4, wherein each of the second transistor and the third transistor has a channel comprising an oxide semiconductor.

6. The signal processing circuit according to claim 4, wherein each of the second transistor and the third transistor has a channel comprising silicon.

7. An electronic device having the signal processing circuit according to claim 4, wherein the electronic device is selected from the group consisting of a display device, a personal computer, and an image reproducing device provided with recording media.

8. An electronic device having the signal processing circuit according to claim 4, wherein the electronic device is selected from the group consisting of a mobile phone, a portable game machine, a portable information terminal, an e-book reader, a video camera, a digital still camera, a goggle-type display, a head mounted display, a navigation system, an audio reproducing device, a car audio system, a digital audio player, a copier, a facsimile, a printer, a multifunction printer, an automated teller machines, and a vending machine.

9. A signal processing circuit comprising:
   a first power line and a second power line;
   a detection circuit electrically connected to the first power line;
   a power supply control circuit electrically connected to the first power line, the second power line, and the detection circuit;
   a first processor electrically connected to the power supply control circuit;
   a second processor configured to receive a detection signal from the detection circuit and transmit a backup instruction to the first processor; and
   a memory device configured to store data from the first processor,
   wherein the power supply control circuit comprises:
   a first switching element comprising a first transistor, wherein one of a source and a drain of the first transistor is electrically connected to the first processor, and the other of the source and the drain of the first transistor is electrically connected to the first power line;
   a switching control portion comprising a second transistor and a third transistor, wherein one of a source and a drain of the second transistor is electrically connected to the first power line, the other of the source and the drain of the second transistor and one of a source and a drain of the third transistor are electrically connected to a gate of the first transistor, and the other of the source and the drain of the third transistor is electrically connected to the second power line;

a first capacitor, a first electrode of the first capacitor electrically connected to the first transistor, and a second electrode of the first capacitor electrically connected to the second power line; and a second capacitor, a first electrode of the second capacitor electrically connected to a gate of the second transistor, and a second electrode of the second capacitor electrically connected to the second power line, and wherein the first transistor has a channel comprising an oxide semiconductor.

10. An electronic device having the signal processing circuit according to claim 9, wherein the electronic device is selected from the group consisting of a display device, a personal computer, and an image reproducing device provided with recording media.

11. An electronic device having the signal processing circuit according to claim 9, wherein the electronic device is selected from the group consisting of a mobile phone, a portable game machine, a portable information terminal, an e-book reader, a video camera, a digital still camera, a goggle-type display, a head mounted display, a navigation system, an audio reproducing device, a car audio system, a digital audio player, a copier, a facsimile, a printer, a multifunction printer, an automated teller machines, and a vending machine.

12. The signal processing circuit according to claim 9, wherein each of the second transistor and the third transistor has a channel comprising an oxide semiconductor.

13. The signal processing circuit according to claim 9, wherein each of the second transistor and the third transistor has a channel comprising silicon.

14. A power supply control circuit comprising:
first and second power lines;
first to third transistors; and
first and second capacitors,
wherein one of a source and a drain of the first transistor is electrically connected to a first electrode of the first capacitor, wherein the other of the source and the drain of the first transistor is electrically connected to the first power line configured to be applied with a high-level potential, wherein one of a source and a drain of the second transistor is electrically connected to a gate of the first transistor and one of a source and a drain of the third transistor, wherein the other of the source and the drain of the second transistor is electrically connected to the first power line, wherein a second electrode of the first capacitor is electrically connected to the second power line configured to be applied with a low-level potential, wherein the other of the source and the drain of the third transistor is electrically connected to the second power line, wherein a gate of the second transistor is electrically connected to a first signal line and a first electrode of the second capacitor, and wherein the first transistor has a channel comprising an oxide semiconductor.

15. The power supply control circuit according to claim 14, wherein each of the second transistor and the third transistor has a channel comprising an oxide semiconductor.

16. The power supply control circuit according to claim 14, wherein each of the second transistor and the third transistor has a channel comprising silicon.

17. The power supply control circuit according to claim 14, wherein a gate of the third transistor is electrically connected to a second signal line.

18. The power supply control circuit according to claim 14, wherein a second electrode of the second capacitor is electrically connected to the second power line.

* * * * *